US012701598B2

(12) United States Patent　　(10) Patent No.:　US 12,701,598 B2
Wu et al.　　　　　　　　　　(45) Date of Patent:　　　Aug. 4, 2026

(54) INTERFERENCE CANCELLATION FOR FULL DUPLEX COMMUNICATION

(71) Applicant: QUALCOMM Incorporated, San Diego, CA (US)

(72) Inventors: Shuanshuan Wu, San Diego, CA (US); Junyi Li, Fairless Hills, PA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 17/655,769

(22) Filed: Mar. 21, 2022

(65) Prior Publication Data

US 2023/0319862 A1　　Oct. 5, 2023

(51) Int. Cl.
H04W 72/00　　(2023.01)
H04W 72/51　　(2023.01)
H04W 72/541　　(2023.01)
H04L 5/14　　(2006.01)

(52) U.S. Cl.
CPC ......... H04W 72/541 (2023.01); H04W 72/51 (2023.01); H04L 5/14 (2013.01)

(58) Field of Classification Search
None
See application file for complete search history.

(56) References Cited

U.S. PATENT DOCUMENTS

2016/0337067 A1* 11/2016 Yokomakura ......... H04L 5/0073
2018/0102807 A1* 4/2018 Chen ................... H04L 27/2657

2018/0115963 A1* 4/2018 Luo ..................... H04L 27/2604
2020/0008230 A1* 1/2020 Yu .......................... H04L 5/0055
2021/0274586 A1* 9/2021 Pelletier ........... H04W 72/1221
2022/0346086 A1* 10/2022 Aiba ..................... H04L 5/0094

FOREIGN PATENT DOCUMENTS

EP　　　　3127385 A1 * 2/2017　　......... H04J 11/0056
WO　　2015044408 A1　4/2015
WO　　2016131814 A1　8/2016

OTHER PUBLICATIONS

ETRI: "Signalling for NAICS", 3GPP TSG-RAN WG1#75, 3GPP Draft, R1-135280, Naics, 3rd Generation Partnership Project (3GPP), Mobile Competence Centre, 650, Route Des Lucioles, F-06921, Sophia-Antipolis Cedex, France, vol. RAN WG1, San Francisco, CA, USA, Nov. 11-Nov. 15, 2013, Nov. 13, 2013 (Nov. 13, 2013), 4 Pages, XP050734974, p. 1, paragraph 2.1-p. 2.
International Search Report and Written Opinion—PCT/US2023/014133—ISA/EPO—Jun. 19, 2023.
Moderator (China Telecom): "Email Discussion Summary for RAN4 Rel-17 Demodulation Scope", RP-201588, 3GPP TSG-RAN Meeting #89-e Electronic Meeting, Sep. 14-18, 2020, 25 Pages.

* cited by examiner

*Primary Examiner* — Abdelillah Elmejjarmi
(74) *Attorney, Agent, or Firm* — Procopio, Cory, Hargreaves & Savitch LLP/QUALCOMM Incorporated

(57)　　　　　ABSTRACT

A first UE may transmit, to a network entity, UE capability of the first UE. The first UE may further receive, from the network entity, a first DCI that schedules a downlink transmission for the first UE and provides IC information for an uplink transmission for a second UE scheduled to at least partially overlap in time and frequency with the downlink transmission. The first UE may further decode the downlink transmission based on at least a portion of the IC information for the uplink transmission.

35 Claims, 14 Drawing Sheets

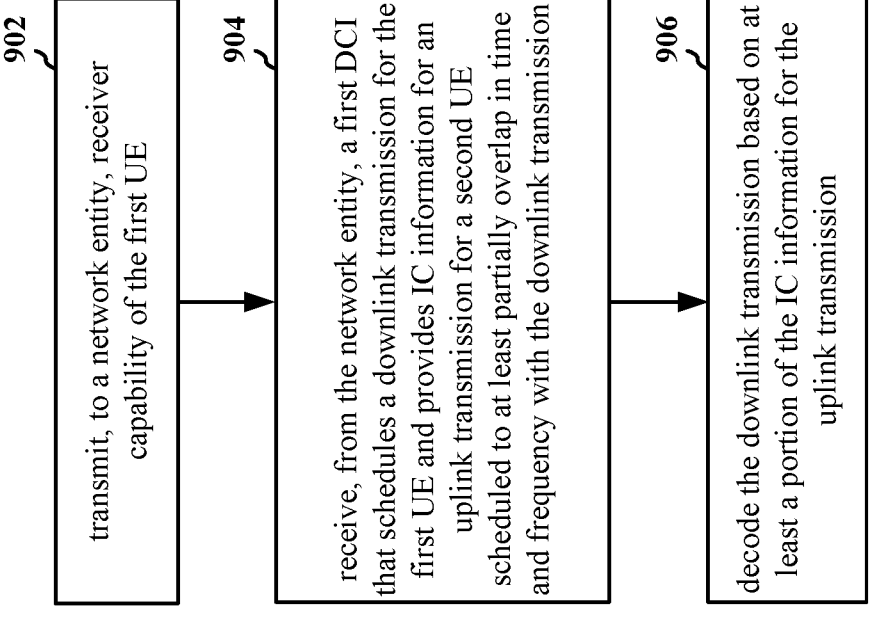

902 transmit, to a network entity, receiver capability of the first UE

904 receive, from the network entity, a first DCI that schedules a downlink transmission for the first UE and provides IC information for an uplink transmission for a second UE scheduled to at least partially overlap in time and frequency with the downlink transmission

906 decode the downlink transmission based on at least a portion of the IC information for the uplink transmission

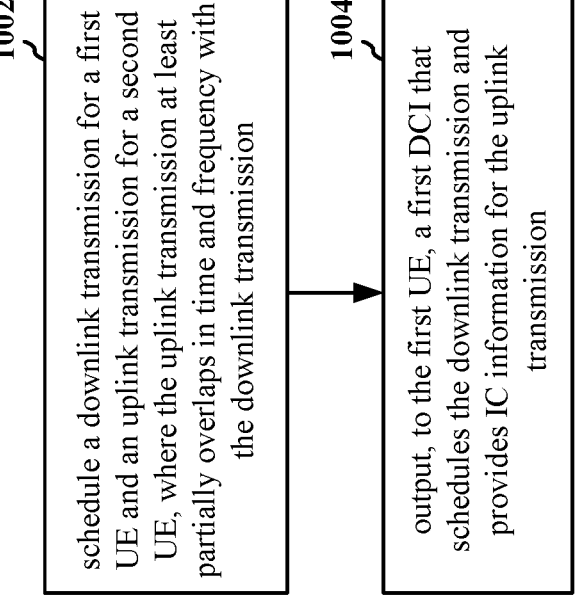
1002
schedule a downlink transmission for a first UE and an uplink transmission for a second UE, where the uplink transmission at least partially overlaps in time and frequency with the downlink transmission
1004
output, to the first UE, a first DCI that schedules the downlink transmission and provides IC information for the uplink transmission
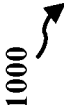
1000
FIG. 10

INTERFERENCE CANCELLATION FOR FULL DUPLEX COMMUNICATION

TECHNICAL FIELD

The present disclosure relates generally to communication systems, and more particularly, to an interference cancellation for full duplex systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first user equipment (UE) are provided. The apparatus may transmit, to a network entity, UE capability of the first UE. The apparatus may further receive, from the network entity, a first downlink control information (DCI) that schedules a downlink transmission for the first UE and provides interference cancellation (IC) information for an uplink transmission for a second UE scheduled to at least partially overlap in time and frequency with the downlink transmission. The apparatus may further decode the downlink transmission based on at least a portion of the IC information for the uplink transmission.

In an aspect of the disclosure, a method, a computer-readable medium, and an apparatus at a network entity are provided. The apparatus may schedule a downlink transmission for a first UE and an uplink transmission for a second UE, where the uplink transmission at least partially overlaps in time and frequency with the downlink transmission. The apparatus may further output, to the first UE, a first DCI that schedules the downlink transmission and provides IC information for the uplink transmission.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 9 is a flowchart of a method of wireless communication.

FIG. 10 is another flowchart of a method of wireless communication.

DETAILED DESCRIPTION

Figure 1:
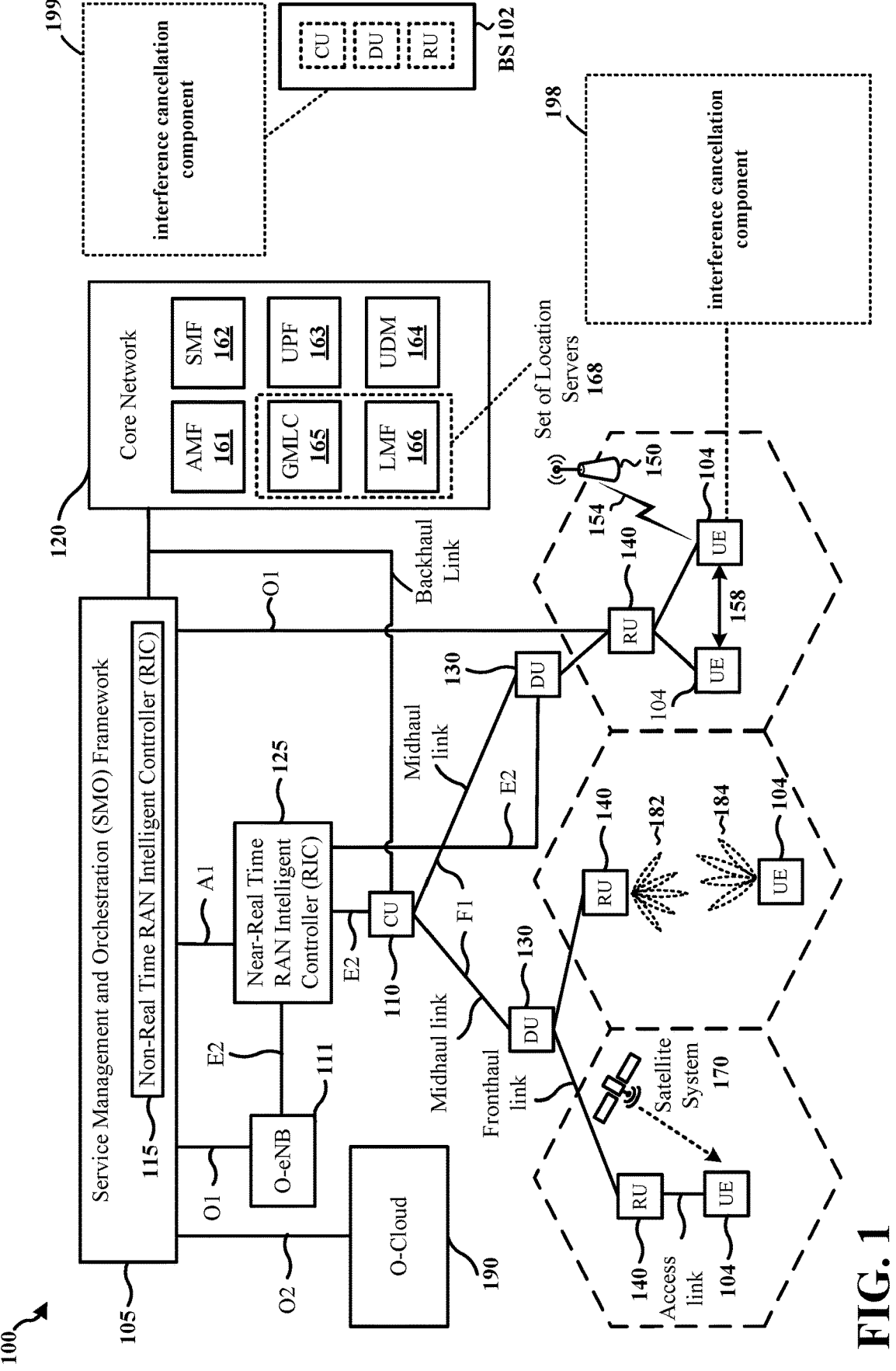
FIG. 1 is a diagram illustrating an example of a wireless communications system and an access network.

Wireless signals that are scheduled to overlap in time, to overlap in frequency, or to be adjacent in frequency, may interfere with one another. Such interference may be inter-cell interference, cross-link interference, remote interference, inter-UE interference, or inter-layer interference. While a receiving device, such as a UE or a network entity, may apply IC to a received signal by demodulating and/or decoding an interference signal and then by cancelling the interference signal out when decoding the received signal, applying IC may not be possible without access to certain IC information, such as a modulation and coding scheme (MCS) or a demodulation reference signal (DMRS) for the interference signal. Some devices, such as UEs, may not have access to such parameters.

An interfered UE, which may be referred to as a victim UE, receiving a transmission may be configured to proactively cancel interference from an interfering UE, which may be referred to as an aggressor UE, using IC. The interfered UE may transmit, to a network entity, UE capability of the interfered UE that allows the network entity to understand that the interfered UE is capable of proactive IC. In response to obtaining UE capability that the interfered UE is capable of proactive IC, the network entity may schedule a downlink transmission for the interfered UE and an uplink transmission for an interfering UE, where the uplink transmission at least partially overlaps in time and frequency with the downlink transmission. The network entity may output, to the interfered UE, a DCI that schedules the downlink transmission and provides IC information for the uplink transmission. The interfered UE may receive the DCI from the network entity and decode the downlink transmission based on at least a portion of the IC information for the uplink transmission to cancel interference from the interfering UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 Interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations

102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite system 170 (e.g., one or more of a Global Navigation Satellite System (GNSS), satellite positioning system (SPS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a first UE 104 may be configured to perform interference cancellation on an UL transmission from a network entity scheduling a DL transmission from a second UE 104 using an interference cancellation component 198. In certain aspects, the base station 102 may be configured to provide interference cancellation to a first and second UE to enable the first UE to perform interference cancellation on an UL transmission that at least partially overlaps in time and frequency with a DL transmission from the second UE using an interference cancellation component 199. Although the following description may be focused on 5G NR, the concepts described herein may be applicable to other similar areas, such as LTE, LTE-A, CDMA, GSM, and other wireless technologies. Moreover, although the following description may be focused on cancelling interference between UEs transmitting and receiving signals with a network entity in FD mode using overlapping or adjacent resources (e.g., time, frequency), the concepts described herein may be applicable to other types of interference, such as interference between network entities, self-interference by a UE in FD mode, or self-interference by a network entity in FD mode.

Figures 2A, 2B, 2C, 2D:
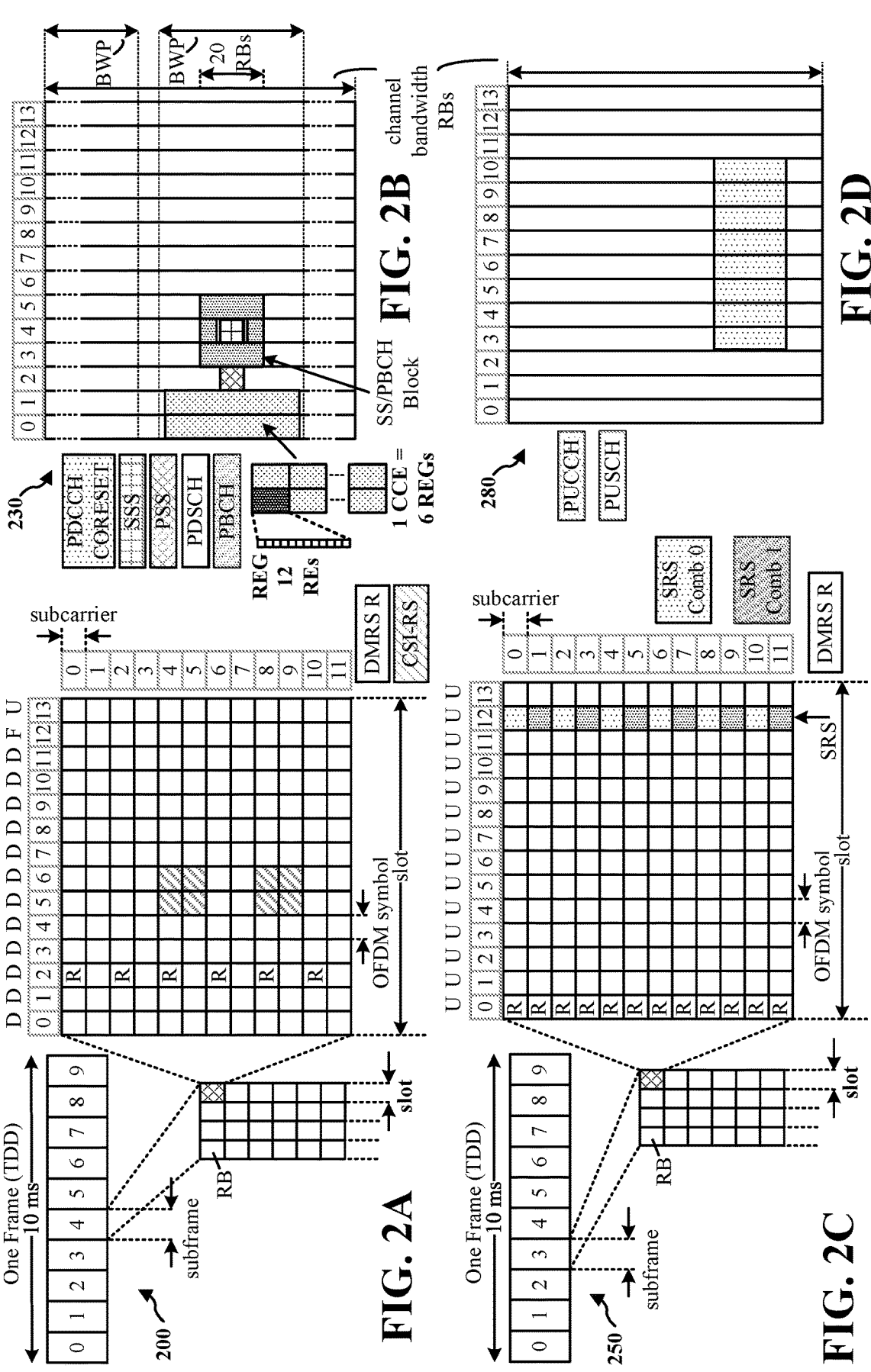
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu*15}$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
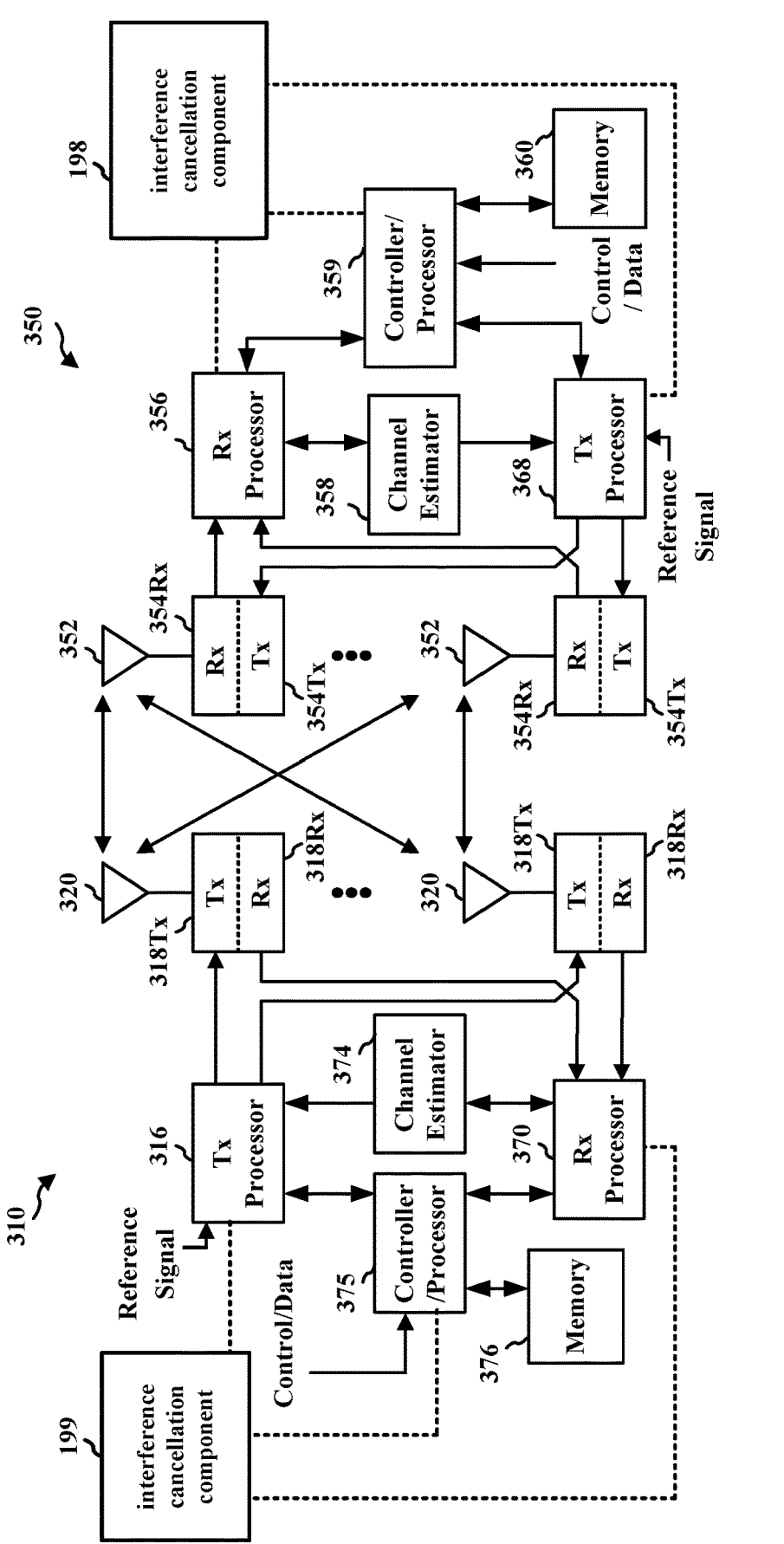
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the interference cancellation component 198 of FIG. 1.

At least one of the Tx processor 316, the Rx processor 370, and the controller/processor 375 may be configured to perform aspects in connection with the interference cancellation component 199 of FIG. 1.

Full-duplex communication may reduce latency. For example, full-duplex operation may enable a device to transmit and receive communication, which can reduce the latency. Full-duplex communication may improve spectrum efficiency, e.g., spectrum efficiency per cell or per UE. Full-duplex communication may enable more efficient use of wireless resources.

Figures 13A, 13B, 13C:
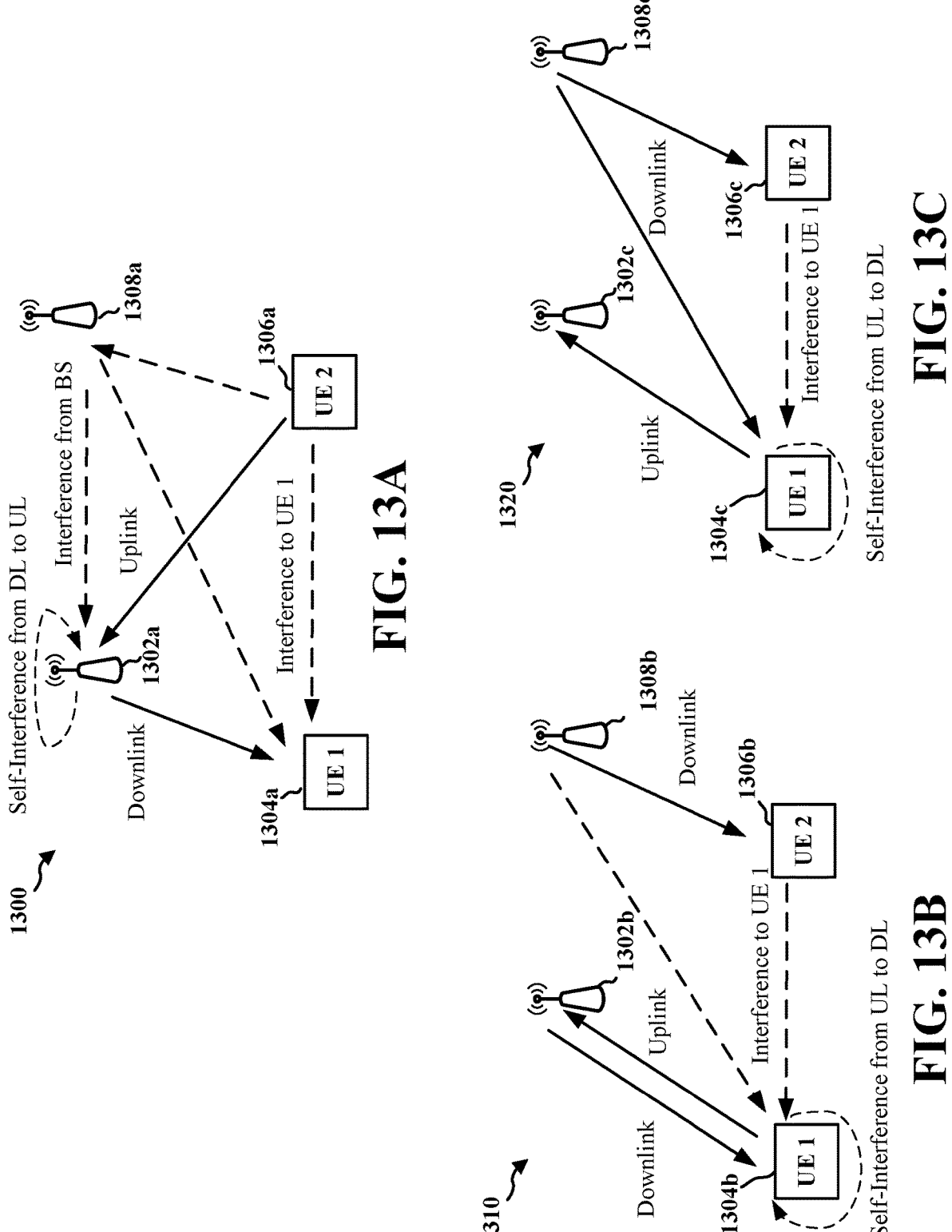
FIGS. 13A, 13B, and 13C illustrate example diagrams of full-duplex wireless communication.

FIGS. 13A-13C illustrate various modes of full-duplex communication. Full-duplex communication supports transmission and reception of information over a same frequency band in manner that overlap in time. In this manner, spectral efficiency may be improved with respect to the spectral efficiency of half-duplex communication, which supports transmission or reception of information in one direction at a time without overlapping uplink and downlink communication. Due to the simultaneous Tx/Rx nature of full-duplex communication, a UE or a base station may experience self-interference caused by signal leakage from its local transmitter to its local receiver. In addition, the UE or base station may also experience interference from other devices, such as transmissions from a second UE or a second base station. Such interference (e.g., self-interference or interference caused by other devices) may impact the quality of the communication, or even lead to a loss of information.

FIG. 13A shows a first example of full-duplex communication 1300 in which a first base station 1302*a* is in full-duplex communication with a first UE 1304*a* and a second UE 1306*a*. The first UE 1304*a* and the second UE 1306*a* may be configured for half-duplex communication or full-duplex communication. FIG. 13A illustrates the first UE 1304*a* performing downlink reception, and the second UE 1306*a* performing uplink transmission. The second UE 1306*a* may transmit a first uplink signal to the first base station 1302*a* as well as to other base stations, such as a second base station 1308*a* in proximity to the second UE 1306*a*. The first base station 1302*a* transmits a downlink signal to the first UE 1304*a* concurrently (e.g., overlapping at least partially in time) with receiving the uplink signal from the second UE 1306*a*. The base station 1302*a* may experience self-interference at its receiving antenna that is receiving the uplink signal from UE 1306*a*, the self-interference being due to reception of at least part of the downlink signal transmitted to the UE 1304*a*. The base station 1302*a* may experience additional interference due to signals from the second base station 1308*a*. Interference may also occur at the first UE 1304*a* based on signals from the second base station 1308*a* as well as based on uplink signals from the second UE 1306*a*.

FIG. 13B shows a second example of full-duplex communication 1310 in which a first base station 1302*b* is in full-duplex communication with a first UE 1304*b*. In this example, the UE 1304*b* is also operating in a full-duplex mode. The first base station 1302*b* and the UE 1304*b* receive and transmit communication that overlaps in time and is in a same frequency band. The base station and the UE may each experience self-interference, due to a transmitted signal from the device leaking to (e.g., being received by) a receiver at the same device. The first UE 1304*b* may experience additional interference based on one or more signals emitted from a second UE 1306*b* and/or a second base station 1308*b* in proximity to the first UE 1304*b*.

FIG. 13C shows a third example of full-duplex communication 1320 in which a first UE 1304*c* transmits and receives full-duplex communication with a first base station 1302*c* and a second base station 1308*c*. The first base station 1302*c* and the second base station 1308*c* may serve as multiple transmission and reception points (multi-TRPs) for UL and DL communication with the UE 1304*c*. The second base station 1308*c* may also exchange communication with a second UE 1306*c*. In FIG. 13C, the first UE 1304*c* may transmit an uplink signal to the first base station 1302*c* that overlaps in time with receiving a downlink signal from the second base station 1308*c*. The first UE 1304*c* may experience self-interference as a result of receiving at least a portion of the first signal when receiving the second signal, e.g., the UE's uplink signal to the base station 1302*c* may leak to (e.g., be received by) the UE's receiver when the UE is attempting to receive the signal from the other base station 1308*c*. The first UE 1304*c* may experience additional interference from the second UE 1306*c*.

Figure 14:
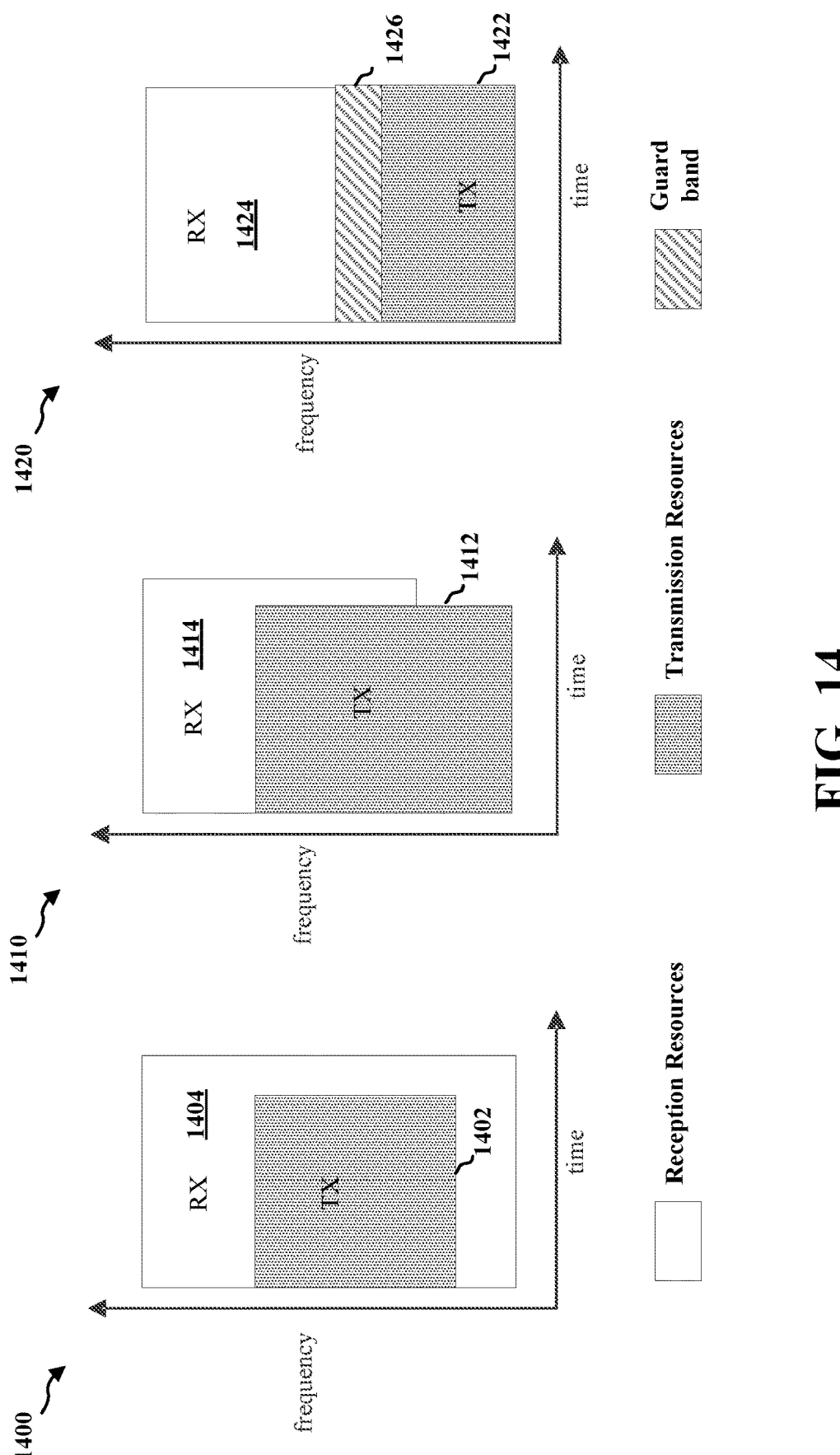
FIG. 14 illustrates examples of in-band full-duplex (IBFD) resources and sub-band frequency division duplex (FDD) resources for full-duplex communication.

Full-duplex communication may be in a same frequency band. The uplink and downlink communication may be in different frequency subbands, in the same frequency subband, or in partially overlapping frequency subbands. FIG. 14 illustrates a first example 1400 and a second example 1410 of in-band full-duplex (IBFD) resources and a third example 1420 of sub-band full-duplex resources. In IBFD, signals may be transmitted and received in overlapping times and may overlap in frequency. As shown in the first example 1400, a time and a frequency allocation of transmission resources 1402 may fully overlap with a time and a frequency allocation of reception resources 1404. In the second example 1410, a time and a frequency allocation of transmission resources 1412 may partially overlap with a time and a frequency allocation of reception resources 1414.

IBFD is in contrast to sub-band FDD, where transmission and reception resources may overlap in time using different frequencies, as shown in the third example 1420. In the third example 1420, the transmission resources 1422 are separated from the reception resources 1424 by a guard band 1426. The guard band may be frequency resources, or a gap in frequency resources, provided between the transmission resources 1422 and the reception resources 1424. Separating the transmission frequency resources and the reception frequency resources with a guard band may help to reduce self-interference. Transmission resources and a reception resources that are immediately adjacent to each other may be considered as having a guard band width of 0. As an output signal from a wireless device may extend outside the transmission resources, the guard band may reduce interference experienced by the wireless device. Sub-band FDD may also be referred to as "flexible duplex".

If the full-duplex operation is for a UE or a device implementing UE functionality, the transmission resources 1402, 1412, and 1422 may correspond to uplink resources, and the reception resources 1404, 1414, and 1424 may correspond to downlink resources. Alternatively, if the full-duplex operation is for a base station or a device implementing base station functionality, the transmission resources 1402, 1412, and 1422 may correspond to downlink resources, and the reception resources 1404, 1414, and 1424 may correspond to uplink resources.

Figure 4:
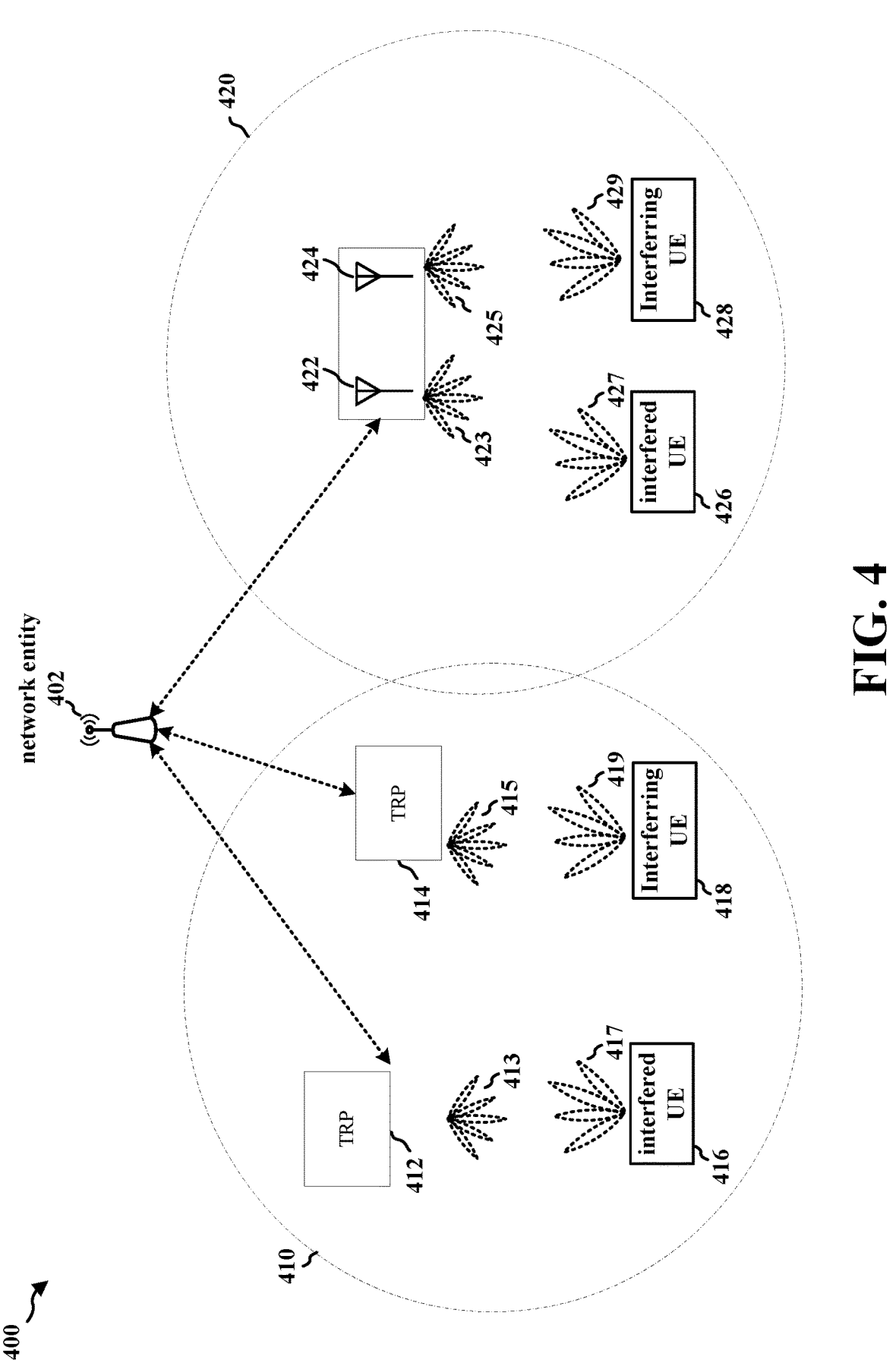
FIG. 4 is a diagram illustrating an example of a wireless communications system having a network entity with full duplex communication capability.

FIG. 4 is a diagram 400 illustrating an example of a wireless communications system having a network entity 402, such as a base station or a component of a base station, with full duplex communication capability, such that the network entity may simultaneously transmit and receive information in the same frequency band. Full duplex may be sub-band based or single-frequency based. For example, a sub-band full duplex (SBFD) device may be configured to output transmissions using one sub-band and obtain transmissions using another sub-band (i.e., different frequency allocation). SBFD may be used as an alternative to TDD deployment. For example, if the network entity 402 has 20 PRBs to use, 10 may be used for Tx and 10 may be used for Rx. Each band may be in different frequencies. While the network entity 402 may create a buffer between the different frequencies, the bands may be so frequency-adjacent that the signals may interfere with one another In another aspect, a single-frequency full duplex (SFFD) device may be configured to output and obtain transmissions using the same frequency or using overlapping frequencies. SFFD may be used with higher frequencies, such as mm wave, as higher frequencies may be more likely to isolate the Tx/Rx if they use overlapping resources (e.g., time, frequency). The network entity 402 may have multiple antennas or multiple antenna panels to enable FD communication. FD downlink and uplink communication may be performed by different antenna elements/panels/TRPs of the network entity 402 in the same (e.g., SFFD) or adjacent (e.g., SBFD) frequencies. The interference may be inter-cell interference (e.g., all cellular networks), cross-link interference (e.g., dynamic TDD), remote interference (e.g., large TDD cell), inter-UE interference (e.g., multiple user MIMO (MU-MIMO)), or inter-layer interference (e.g., single user MIMO (SU-MIMO)).

For example, network entity 402 may have a first TRP 412 configured to transmit signals 413 to the interfered UE 416, and the interfered UE 416 may be configured to transmit signals 417 to the first TRP 412. Network entity 402 may also have a second TRP 414 configured to transmit signals 415 to the interfering UE 418, and the interfering UE 418 may be configured to transmit signals 419 to the second TRP 414. The first TRP 412, second TRP 414, interfered UE 416, and interfering UE 418 may have an overlapping coverage area 410.

Moreover, the signals 413 to the interfered UE 416, and the signals 419 from the interfering UE 418 may at least partially overlap in time and frequency with one another (i.e., facilitate simultaneous Tx/Rx). In other words, the network entity 402 may output data to the first TRP 412 that transmits signals 413 to the interfered UE 416 in downlink, while at the same time obtaining data from the second TRP 414 via signals 419 from the interfering UE 418 in uplink. Interference from an UL Tx of an interfering UE (e.g., signals 419 from the interfering UE 418 to the second TRP 414) to a DL Rx of an interfered UE (e.g., signals 413 from the first TRP 412 to the interfered UE 416) may constitute inter-UE interference. Such inter-UE interference may be managed by proper UE pairing, for example by the network entity 402 pairing the interfered UE 416 with the interfering UE 418 in the shared coverage area 410. Proper Tx/Rx isolation, beamforming, or IC may alleviate inter-UE interference. However, the interfered UE 416 and the interfering UE 418 may not be paired for simultaneous full duplex communication with the network entity 402 if the interference is too strong (i.e., meets or exceeds a threshold value). Interference from an UL Tx of an interfering UE (e.g., signals 419 from the interfering UE 418 to the second TRP 414) to a DL Rx of an interfered UE (e.g., signals 417 from the interfered UE 416 to the first TRP 412) may constitute self-interference (SI) between a transmit antenna and a receive antenna in a FD device. The FD device may measure SI, and may alleviate SI using proper Tx/Rx isolation, beamforming, or IC.

Similarly, network entity 402 may have a first antenna element 422 configured to transmit signals 423 to the interfered UE 426, and the interfered UE 426 may be configured to transmit signals 427 to the first antenna element 422. The network entity 402 may also have a second antenna element 424 configured to transmit signals 425 to the interfering UE 428, and the interfering UE 428 may be configured to transmit signals 429 to the second antenna element 424. The interfered UE 416, and interfering UE 418 may have an overlapping coverage area 420.

The signals 423 to the interfered UE 426, and the signals 429 from the interfering UE 428 may at least partially overlap in time and frequency with one another (i.e., facilitate simultaneous Tx/Rx), or be adjacent in frequency that they interfere with one another. In other words, the network entity 402 may output data to the antenna that transmits signals 423 to the interfered UE 426 in downlink, while at the same time obtaining data from the antenna via signals 429 from the interfering UE 428 in uplink. Interference from an UL Tx of an interfering UE (e.g., signals 429 from the interfering UE 428 to the antenna) to a DL Rx of an interfered UE (e.g., signals 423 from the antenna to the interfered UE 426) may constitute inter-UE interference. Such inter-UE interference may be managed by proper UE pairing, for example by the network entity 402 pairing the interfered UE 426 with the interfering UE 428 in the coverage area 420. Proper Tx/Rx isolation, beamforming, or IC may alleviate inter-UE interference. However, the interfered UE 426 and the interfering UE 428 may not be paired for simultaneous full duplex communication with the network entity 402 if the interference is too strong (i.e., meets or exceeds a threshold value). Interference from an UL Tx of an interfering UE (e.g., signals 429 from the interfering UE 428 to the antenna) to a DL Rx of an interfered UE (e.g., signals 427 from the interfered UE 426 to the antenna) may constitute self-interference (SI) between a transmit antenna and a receive antenna in a FD device. The FD device may measure SI, any may alleviate SI using proper Tx/Rx isolation, beamforming, or IC.

Network assisted IC (NAIC) may be used for LTE downlink reception. In one aspect, the interfered UE 416 may proactively decode an UL transmission of signals 419 from a neighboring cell, and may cancel the interference in its desired signal decoding of a DL transmission of signals 413. In another aspect, advanced receivers in NR (e.g., radio access network 4 (RAN4)) may be used to address interference, such as interference in SU-MIMO, MU-MIMO, or inter-cell interference. An interfered UE may perform channel estimation to recover the transmitted signal using a reference signal (RS), such as a demodulation reference signal (DMRS). For example, the interfered UE 416 may demodulate/decode an interference signal of signals 419 and then cancel it out in decoding a desired signal of signals 413, or the interfered UE 426 may demodulate/decode an interference signal of signals 429 and then cancel it out in decoding a desired signal of signals 423. Any suitable IC may be used. For example, the IC may be symbol level IC (SLIC), which may include channel estimation, demodulation, hard decision, reconstruction of the received interfering signal, interference cancellation, and desired signal detection. In another aspect, the IC may be codeword level IC (CWIC), which may include performing decoding and re-encoding. CWIC may be more robust than SLIC.

The network entity 402 may be configured to pair UEs to minimize interference between UEs, such as the interfered UE 416 and the interfering UE 418 in coverage area 410 or the interfered UE 426 and the interfering UE 428 in coverage area 420. The network entity 402 may be configured to prevent an UL and a DL resource from being scheduled in the same or in overlapping resources in response to determining that the interfered UE 416 experiences strong interference (e.g., interference that meets or exceeds a threshold level) from the interfering UE 418's signals 419. However, such pairing may require a large number of measurements to be performed in the coverage area 410, which may lead to significant signaling overhead and latency. Even with proper UE pairing, interference of DL reception by a paired UL transmission may be merely reduced, but not eliminated. An interfered UE may still suffer performance for receiving a DL transmission.

An interfered UE receiving a transmission in DL may be configured to proactively cancel interference from an interfering UE's UL Tx using IC. The IC may reduce the interference to a level that reduces or obviates a requirement to measure UE interference measurements for pairing UEs. Reducing a number of, or completely obviating, interference measurements may reduce signaling overhead and latency, and may also simplify FD communication at a network entity. However, enabling such proactive IC may require the interfered UE to be aware of the interfering UE's Tx configuration and/or parameters. There is a need to efficiently and effectively provide an interfering UE's TX configuration and/or parameters to an interfered UE to enable the interfered UE to proactively cancel interference from the interfering UE's UL Tx using IC.

An interfered UE may transmit, to a network entity, UE capability of the interfered UE that allows the network entity to understand that the interfered UE is capable of proactive IC. In response to obtaining UE capability that the interfered UE is capable of proactive IC, the network entity may schedule a downlink transmission for the interfered UE and an uplink transmission for an interfering UE, where the uplink transmission at least partially overlaps in time and frequency with the downlink transmission. The network entity may output, to the interfered UE, a DCI that schedules the downlink transmission and provides IC information for the uplink transmission. The interfered UE may receive, from the network entity, the DCI. The interfered UE may further decode the downlink transmission based on at least a portion of the IC information for the uplink transmission.

In other words, the interfered UE may receive a set of parameters (e.g., IC information) relevant to the paired interfering UE's UL transmission in FD. The interfered UE may be configured to perform proactive IC in DL receiving based at least on some of the set of parameters. With such proactive IC, the overhead for UE pairing (e.g., interference measurements) may be reduced or avoided. Furthermore, scheduling in FD communication may be more flexible, and may be timelier without such overhead. A network entity may schedule DL reception for interfered UEs capable of proactive IC without making specific considerations for FD UE pairing. For example, the network entity may assume that an interfered UE capable of proactive IC will perform IC before DL decoding, reducing or obviating inter-UE interference to the interfered UE's DL reception.

In some aspects, the network entity may provide both the set of parameters and interference measurements to an interfered UE so that the interfered UE may use inter-UE interference measurements to improve its proactive IC. In some aspects, the network entity may also provide an interfering UE's timing advance (TA) to the interfered UE, allowing the interfered UE to properly time when to perform its proactive IC.

Figure 5:
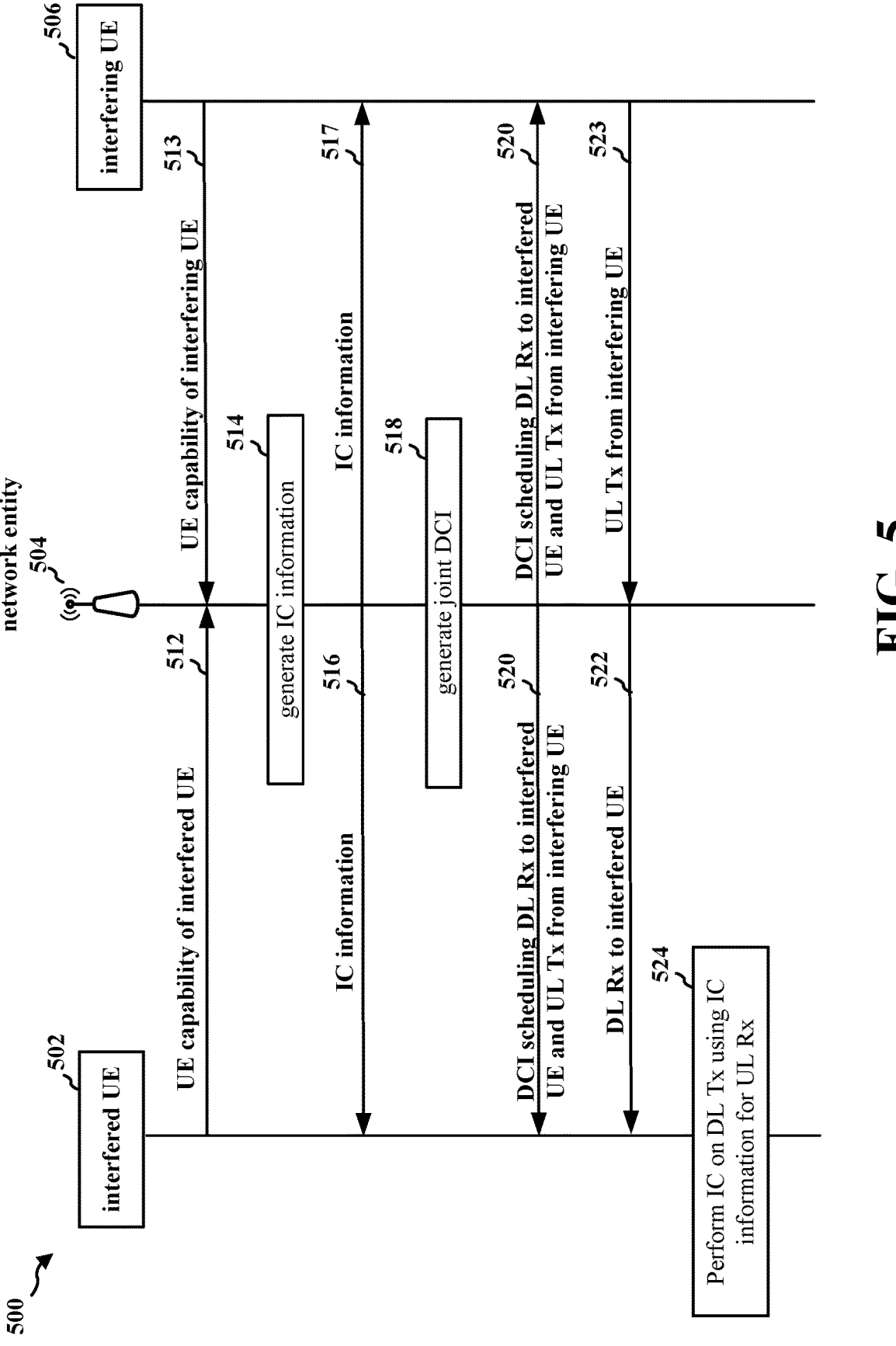
FIG. 5 is a communication flow diagram of a network entity configured to use a joint DCI configuration with an interfered UE and an interfering UE.

FIG. 5 illustrates a communication flow diagram 500 of a network entity 504 configured to use a joint DCI configuration with an interfered UE 502 and an interfering UE 506. A network entity 504 may be configured to output a single DCI to both the interfered UE 502 and the interfering UE 506 that schedules both DL communication to the interfered UE 502 and UL transmission from interfering the UE 506. The interfered UE 502 may transmit UE capability 512 to the network entity 504. The UE capability may include an indication that the interfered UE 502 is capable of proactive IC. The UE capability may include a report that indicates what IC operation the interfered UE 502 will be performing (e.g., CWIC, SLIC). In response, the network entity 504 may determine what parameters (e.g., interfering UE 506 parameters) may be shared with, or provided to, the interfered UE 502.

At 514, the network entity 504 may generate IC information 516 that may be needed for interference cancellation. For example, the network entity 504 may output IC information 516 including a shared radio network temporary identifier (RNTI) that is used to scramble a cyclic redundancy check (CRC) of the shared DCI. The IC information 516 may include a PUSCH DMRS sequence seed. The DMRS sequence seed may be based on the cell identifier (ID) shared by the interfered UE 502 and the interfering UE 506. The IC information 516 may include a cell ID and/or another ID shared by both the interfered UE 502 and the interfering UE 506. The IC information 516 may include a shared scrambling ID that is shared by the interfered UE 502 and the interfering UE 506. In some aspects the PUSCH scrambling sequence seed that is based on the RNTI, and/or based on an ID shared by both the interfered UE 502 and the interfering UE 506 (e.g., cell ID), allowing the interfered UE 502 to determine the PUSCH scrambling sequence without the PUSCH scrambling sequence being transmitted to the interfered UE 502. The network entity 504 may be configured to provide IC information that has an impact to the air interface, which the interfered UE 502 may use to decide how it performs IC, or may be configured to provide a DMRS, which the interfered UE 502 may use to decide how to perform channel estimation. The network entity 504 may output the IC information 516 to the interfered UE 502. The IC information 516 may have an indicator that indicates that a parameter is shared between the DL Rx 522 and the UL Tx 523. The IC information may be configured by RRC. The network entity 504 may output some or all of the same IC information to the interfering UE 506 as IC information 517, such as a shared RNTI or a PUSCH DMRS sequence seed.

Additional IC information may be provided to the interfered UE 502 using a joint DCI 520.

At 518, the network entity 504 may generate a joint DCI 520 for the interfered UE 502 and the interfering UE 506. The joint DCI 520 may have fields indicating specific parameters for the DL transmission to the interfered UE 502. Such DL specific parameters may include a PDSCH modulation and coding scheme (MCS), a PDSCH new data indicator, a PDSCH redundancy version, a PDSCH HARQ process number, and/or a downlink assignment index. The joint DCI 520 may have fields indicating specific parameters for the UL transmission from the interfering UE 506. Such UL specific parameters may include PUSCH MCS, a PUSCH new data indicator, PUSCH redundancy version, a PUSCH HARQ process number, and/or a transport power control (TPC) command for PUSCH. The joint DCI 520 may have fields indicated shared parameters for both the DL transmission to the interfered UE 502 and the UL transmission to the interfering UE 506. Such shared parameters may include a shared PDSCH/PUSCH MCS, a shared PDSCH/PUSCH new data indicator, a shared PDSCH/PUSCH redundancy version, a shared PDSCH/PUSCH HARQ process number, a time domain resource assignment and/or a frequency domain resource assignment. A frequency domain resource assignment may also be separate for the two UL and DL transmissions, such as when the transmissions are configured to be partially overlapping in FD.

Use of such a joint DCI allows the interfered UE 502 to know parameters of the interfering UE 506's UL transmission, which may allow the interfered UE 502 to demodulate and/or decode the UL Tx 523 from the interfering UE 506. In some aspects, the network entity 504 may schedule the transmissions to fully overlap with one another, which means only one field for both the UL transmission and the DL transmission. For example, the number of OFDM symbols or the symbol locations may be the same for both the UL and the DL transmissions. The FD may be fully overlapping or partially overlapping. For example, the DCI may use one frequency domain resource assignment for a fully overlapping FD, or two frequency domain resource assignments (e.g., one for the UL and another for the DL).

The network entity 504 may output the joint DCI 520 to both the interfered UE 502 and the interfering UE 506. The interfering UE 506 may transmit the UL Tx 523 to the network entity 504 and the interfered UE 502 may receive the DL Rx 522 from the network entity 504. The UL Tx 523 and the DL Rx 522 may at least partially overlap in time, may at least partially overlap in frequency, and/or may be adjacent in frequency so as to interfere with one another. At 524, the interfered UE 502 may perform IC on the DL Rx 522 using IC information for the UL Tx 523.

In another aspect, the interfered UE 502 may be configured to perform proactive IC on the UL Tx 523 if the network entity 504 outputs the IC information to the interfered UE 502 in a transmission separate from the DCI 520, but such an aspect may not be as efficient as the aspect shown in communication flow diagram 500. While communication flow diagram 500 shows the interfered UE 502 separate from the interfering UE 506, the interfered UE 502 and the interfering UE 506 may be the same UE configured to operate in FD mode.

The interfering UE may be configured to transmit UE capability 513 to the network entity 504. The UE capability 513 of interfering UE 506 may include an indication that the interfering UE 506 is capable of reading a joint DCI having shared parameters. Similarly, the UE capability 512 of the interfered UE 502 may include an indication that the interfered UE 502 is capable of reading a joint DCI having shared information. In response to the UE capability 512 or the UE capability 513 indicating that the interfered UE 502 or the interfering UE 506, respectively, is incapable of reading a joint DCI having shared information, the network entity 504 may be configured to not generate shared IC information or a joint DCI, and may instead use other separate DCIs to schedule transmissions. The joint DCI configuration shown in communication flow diagram 500 rapidly and effectively provides relevant IC information to the interfered UE 502, a joint DCI may not be useful for legacy UEs that do not have the capability to read a joint DCI having shared information.

Figure 6:
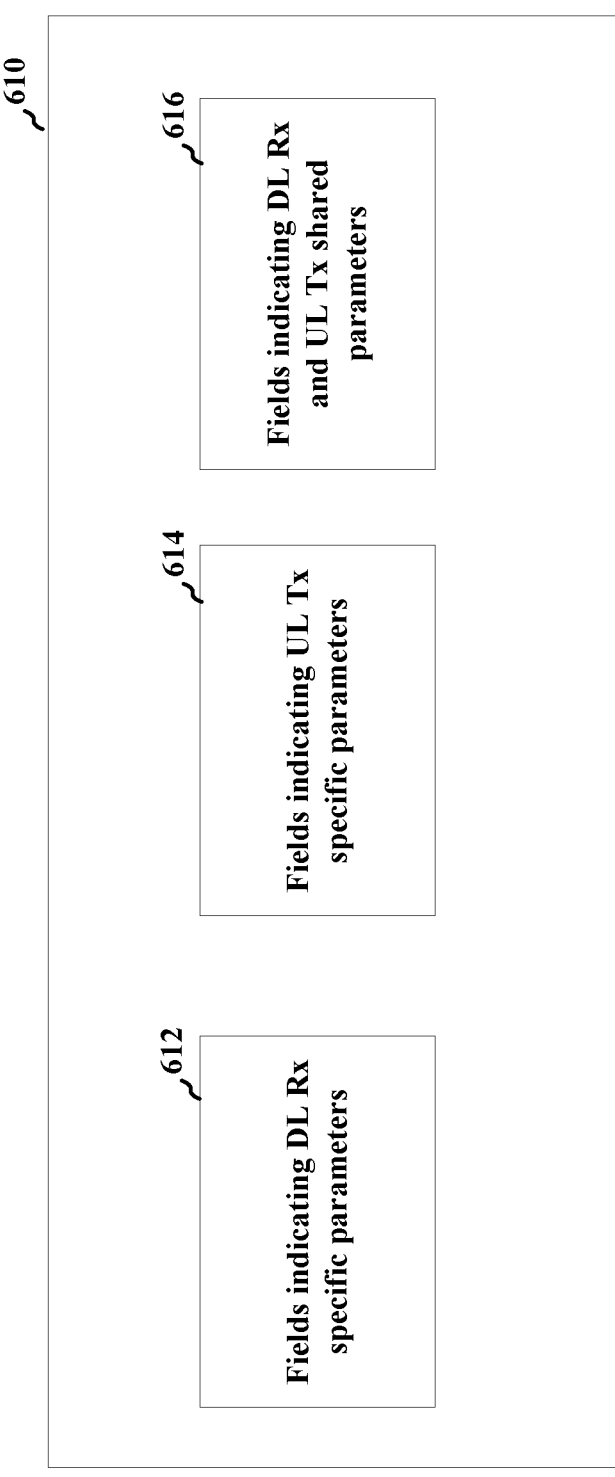
FIG. 6 is a logical diagram of an example joint DCI.

FIG. 6 shows logical diagram 600 of an example joint DCI 610, having DL Rx specific parameters 612, UL Tx specific parameters, and shared parameters 616. While the parameters are shown symbolically as being located in separate sections of the joint DCI 610, the parameters may be interleaved between one another. The joint DCI may have fields indicating specific parameters for the DL transmission to the interfered UE. Such DL specific parameters may include a PDSCH modulation and coding scheme (MCS), a PDSCH new data indicator, a PDSCH redundancy version, a PDSCH HARQ process number, and/or a downlink assignment index. The joint DCI may have fields indicating specific parameters for the UL transmission from the interfering UE. Such UL specific parameters may include PUSCH MCS, a PUSCH new data indicator, PUSCH redundancy version, a PUSCH HARQ process number, and/or a TPC command for PUSCH. The joint DCI may have fields indicated shared parameters for both the DL transmission to the interfered UE and the UL transmission to the interfering UE. Such shared parameters may include a shared PDSCH/PUSCH MCS, a shared PDSCH/PUSCH new data indicator, a shared PDSCH/PUSCH redundancy version, a shared PDSCH/PUSCH HARQ process number, a time domain resource assignment and/or a frequency domain resource assignment. A frequency domain resource assignment may also be separate for the two UL and DL transmissions, such as when the transmissions are configured to be partially overlapping in FD. While the joint DCI 610 may rapidly and effectively provide relevant IC information to an interfered UE, the joint DCI 610 includes extra overhead that may not be useful to the interfering UE. For example, an interfering UE may not need to use the information in the DL Rx specific parameters 612, as the interfering UE does not need to perform IC using those parameters.

Figure 7:
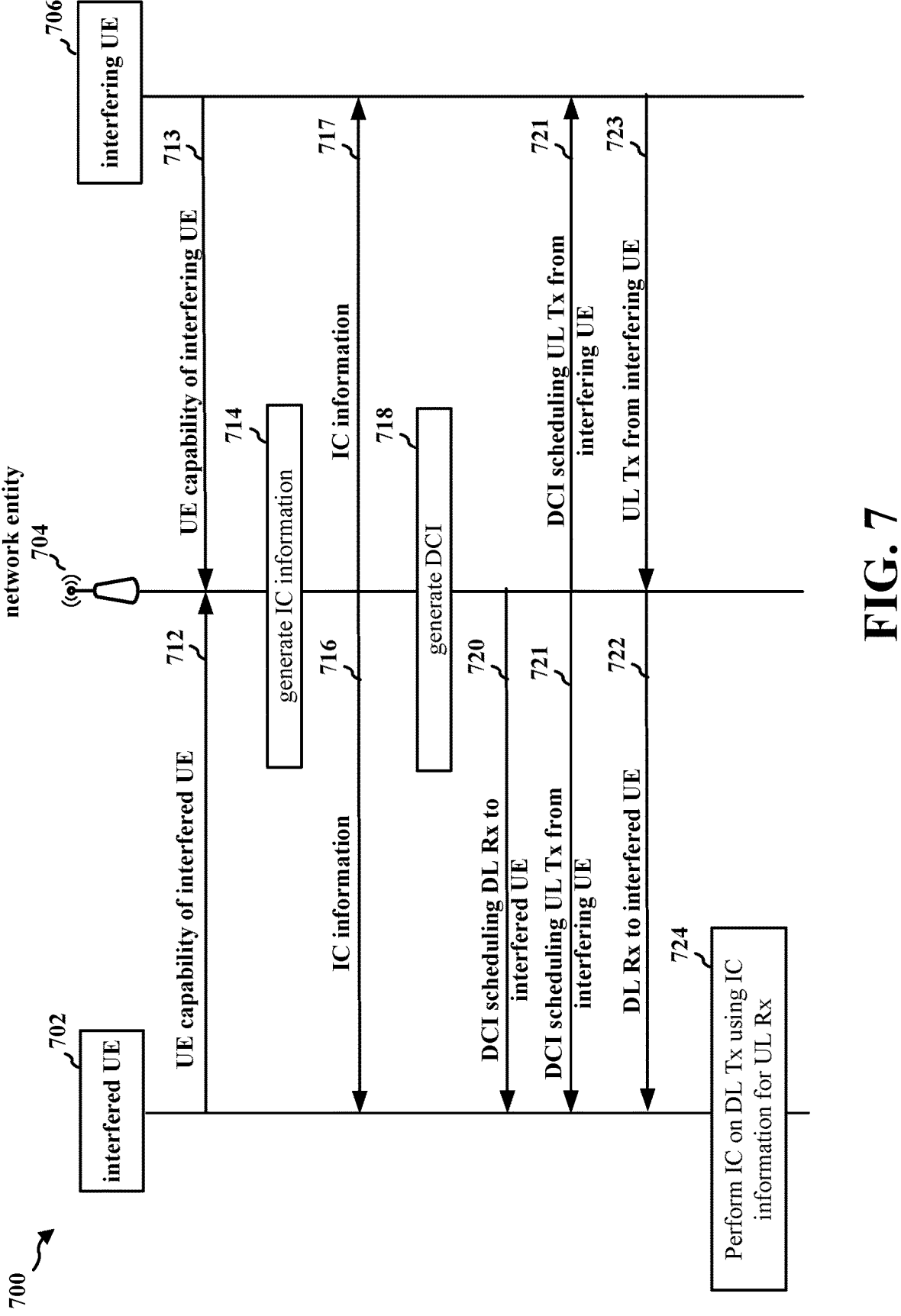
FIG. 7 is a communication flow diagram of a network entity configured to use a separate DCI, shared parameter configuration with an interfered UE and an interfering UE.

FIG. 7 illustrates a communication flow diagram 700 of a network entity 704 configured to use a separate DCI, shared parameter configuration with an interfered UE 702 and an interfering UE 706. A network entity 704 may be configured to use shared parameters to generate a DCI 720 to the interfered UE 702 and a DCI 721 to the interfering UE 706. This allows the interfered UE to decode DCI 721 scheduling the interfering UE 706's UL Tx. Similar to the communication flow diagram 500 in FIG. 5, the interfered UE 702 may transmit UE capability 712 to the network entity 704.

At 714, the network entity 704 may generate IC information 716 that may be needed for interference cancellation. For example, the network entity 704 may output IC information 716 including a shared RNTI that is used to scramble a CRC of both the DCI 720 and the DCI 721. The IC information 716 may include a PUSCH DMRS sequence seed (e.g., shared scrambling ID by the interfered UE 702 and the interfering UE 706). The PUSCH DMRS sequence seed may be based on the cell ID shared by the interfered UE 702 and the interfering UE 706. The network entity 704 may not include the PUSCH scrambling seed in the IC information 716 if the UE capability 712 indicates that the interfered UE uses SLIC. The IC information 716 may include a cell ID and/or another ID shared by both the interfered UE 702 and the interfering UE 706. The IC information 716 may include a data channel (e.g., PDSCH/PUSCH) scrambling seed. In some aspects the scrambling sequence seed that is based on the RNTI, and/or based on an ID shared by both the interfered UE 702 and the interfering UE 706 (e.g., cell ID), allowing the interfered UE 702 to determine the PUSCH scrambling sequence without the network entity 704 outputting the PUSCH scrambling sequence to the interfered UE 702. The IC information may be configured by RRC. The network entity 704 may be configured to provide IC information that has an impact to the air interface, which the interfered UE 702 may use to decide how it performs IC, or may be configured to provide a DMRS, which the interfered UE 702 may use to decide how to perform channel estimation. The network entity 704 may output the IC information 716 to the interfered UE 702. The IC information 716 may have an indicator that indicates that a parameter is shared between the DL Rx 722 and the UL Tx 723. The network entity 704 may output some or all of the same IC information to the interfering UE 706 as IC information 717, such as a shared RNTI or a PUSCH DMRS sequence seed.

At 718, the network entity 704 may generate the DCI 720 for the DL Rx 722 to the interfered UE 702 and the DCI 721 for the UL Tx 723 from the interfering UE 706. The DCI 720 and 721 may be configured to have shared parameters, such as a shared RNTI or shared sequence seed. An RRC may provide parameters to the interfered UE 702 and the interfering UE 706, which the DCI may select from. The interfered UE 702 may be configured to use at least a portion of the IC information 716 to decode the DCI 721 sent to the interfering UE 706 to determine additional IC information. Such additional IC information may allow the interfered UE 702 to demodulate and/or decode the UL Tx 723 (i.e., PUSCH) from the interfering UE 706 for IC.

The interfering UE 706 may transmit the UL Tx 723 to the network entity 704 and the interfered UE 702 may receive the DL Rx 722 from the network entity 704. The UL Tx 723 and the DL Rx 722 may at least partially overlap in time, may at least partially overlap in frequency, and/or may be adjacent in frequency so as to interfere with one another. The interfered UE 702 may then perform IC on the DL Rx 722 using IC information for the UL Tx 723.

In one aspect, the network entity 704 may be configured to assign the interfered UE 702 a set of separate parameters not used for FD scheduling and a set of shared parameters used for FD scheduling. The separate parameters may include cell RNTI (C-RNTI), a sequence seed specific to the interfered UE 702, and/or a scrambling sequence seed. The shared parameters may include a shared RNTI, a shared DMRS sequence seed, and/or a shared scrambling sequence seed. The network entity 704 may dynamically assign separate parameters or the shared parameters to the interfered UE in response to whether the interfered UE is scheduled to receive a DL Rx 722 in FD mode (i.e., overlapping with the UL Tx 723). The interfered UE 702 may be configured to blind decode the DCI 720 using both the C-RNTI separate parameter and the shared RNTI shared parameter to determine whether to perform proactive IC. In response to successfully decoding the DCI 720 using the shared RNTI, at 724 the interfered UE 702 may then decode the DCI 721 and perform IC on the DL Rx 722 using IC information for the UL Tx 723.

In one aspect, the network entity 704 may determine whether to schedule the interfered UE 702 in response to the UE capability 712 of the interfered UE 702. In response to the UE capability 712 indicating that the interfered UE 702 is capable of proactive IC, the network entity 704 may configure the interfered UE 702 to use shared parameters. In response to the UE capability 712 indicating that the interfered UE 702 is not capable of proactive IC, the network entity 704 may configure the interfered UE 702 to use separate parameters.

The interfering UE may be configured to transmit UE capability 713 to the network entity 704. The UE capability 713 of interfering UE 706 may include an indication that the interfering UE 706 is capable of reading a DCI having shared parameters. Similarly, the UE capability 712 of interfered UE 702 may include an indication that the interfered UE 702 is capable of reading a DCI having shared parameters. In response to the UE capability 712 indicating that the interfered UE 702 is incapable of reading a DCI having shared parameters, the network entity 704 may be configured to not generate shared IC information or a DCI having shared parameters for the interfered UE 702 to utilize. Likewise, in response to the UE capability 713 indicating that the interfering UE 706 is incapable of reading a DCI having shared parameters, the network entity 704 may be configured to not generate shared IC information or a DCI having shared parameters for the interfering UE 706 to utilize.

In response to the UE capability 713 indicating that the interfering UE 706 is incapable of reading a DCI having shared parameters, and the UE capability 712 indicating that the interfered UE 702 is capable of reading a DCI having shared parameters, the network entity 704 may be configured to generate a different, legacy DCI for the interfering UE 706 that does not contain any indications that any of the parameters in DCI 721 are shared with the interfered UE 702 while generating a DCI for the interfered UE 702 that contains indications that some parameters may be shared between the interfered UE 702 and the interfering UE 706. In other words, in response to the UE capability 712 indicating that the interfered UE 702 is capable of reading a DCI having shared parameters and the UE capability 713 indicating that the interfering UE 706 is incapable of reading a DCI having shared parameters, at 718 the network entity 704 may generate a DCI 720 for the interfered UE 702 that indicates that some parameters are specific to the interfered UE 702 and other parameters are shared between the interfered UE 702 and the network entity 704 may generate a DCI 721 for the interfering UE 706 that merely indicates parameters for the scheduling UL Tx 723.

Figure 8:
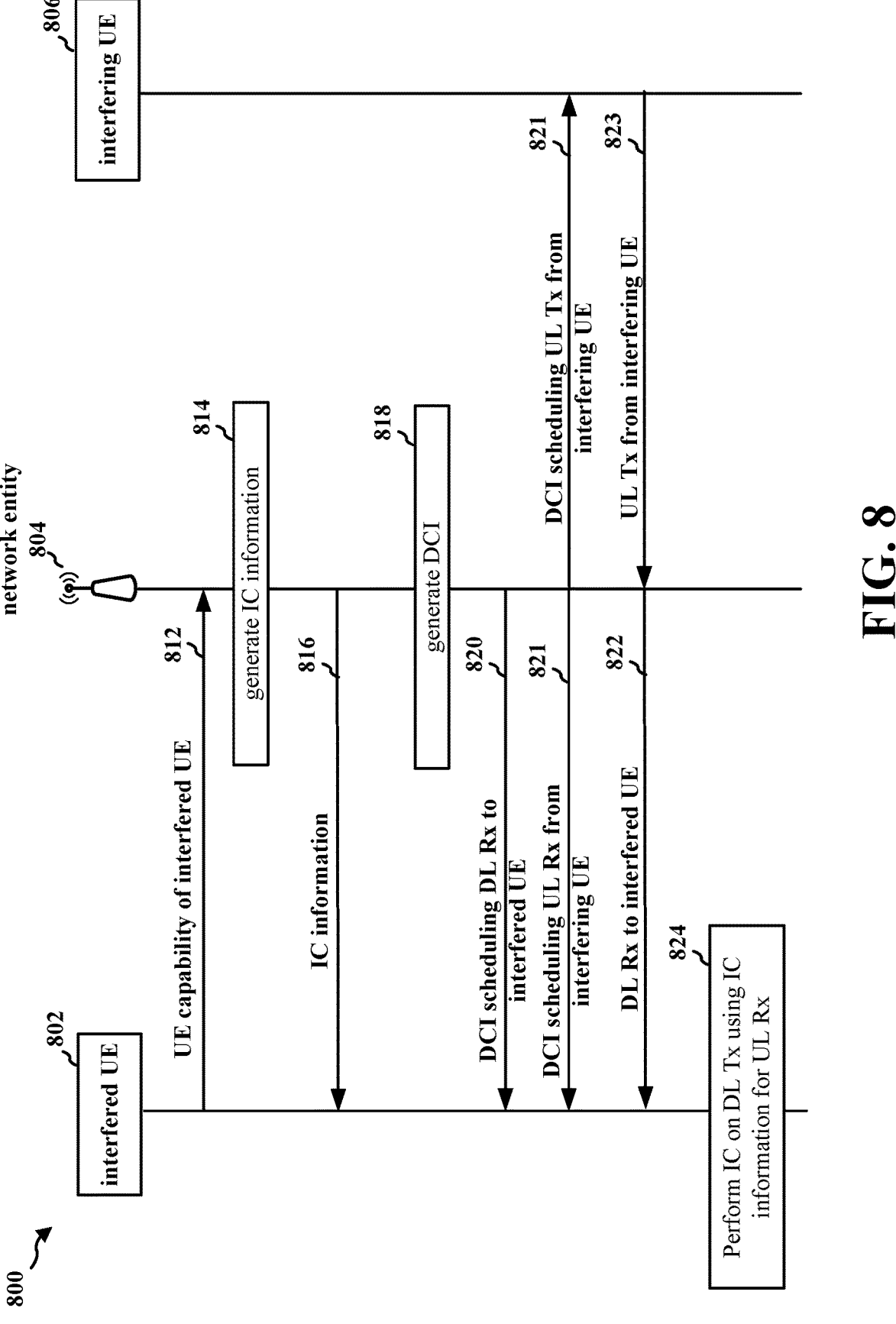
FIG. 8 is a communication flow diagram of a network entity configured to use a separate DCI, shared parameter configuration with an interfered UE and an interfering UE.

FIG. 8 illustrates a communication flow diagram 800 of a network entity 804 configured to use a separate DCI, separate parameter configuration with an interfered UE 802 and an interfering UE 806. A network entity 804 may be configured to use separate parameters to generate a DCI 20 to the interfered UE 802 and a DCI 821 to the interfering UE 806. The network entity 804 may send some parameters as IC information 816 to the interfered UE 802 such that the interfered UE 802 may decode the DCI 821 scheduling the UL Tx 823 from the interfering UE 806, allowing the interfered UE 802 to demodulate and/or decode the interfering UE 806's UL Tx 823. Similar to the communication flow diagram 500 in FIG. 5, the interfered UE 802 may transmit UE capability 812 to the network entity 804.

At 814, the network entity 804 may generate IC information 816 that may be needed for interference cancellation. For example, the network entity 804 may output IC information 816 including an RNTI that is used to scramble a CRC of the DCI 821. The IC information 816 may include a PUSCH DMRS sequence seed used by the interfering UE 806. The IC information 816 may include a PUSCH scrambling seed (e.g., the scrambling ID) used by the interfering UE 806. The network entity 804 may not include the PUSCH scrambling seed in the IC information 816 if the UE capability 812 indicates that the interfered UE uses SLIC. The IC information may be configured by RRC. The network entity 704 may output the IC information 716 to the interfered UE 702.

At 818, the network entity 804 may generate the DCI 820 for the DL Rx 822 to the interfered UE 802 and the DCI 821 for the UL Tx 823 from the interfering UE 806. The DCI 820 and 821 may be configured to not have any shared parameters, such as a shared RNTI or shared sequence seed. An RRC may provide parameters to the interfered UE 802 and the interfering UE 806, which the DCI may select from. The interfered UE 802 may be configured to use at least a portion of the IC information 816 to decode the DCI 821 sent to the interfering UE 806 to determine additional IC information, such as UL resource allocation, and MCS. Such additional IC information may allow the interfered UE 802 to demodulate and/or decode the UL Tx 823 (i.e., PUSCH) from the interfering UE 806 for IC. The network entity 804 may be configured to specify IC information that has an impact to the air interface, which the interfered UE 802 may use to decide how it performs IC, or may be configured to provide a DMRS, which the interfered UE 802 may use to decide how to perform channel estimation. The IC information 816 may include RRC scheduling, and the DCI 820 may indicate the RNTI of the DCI 821 to the interfered UE 802 by selecting the RNTI from a list of RNTI in an RRC message.

The interfering UE 806 may transmit the UL Tx 823 to the network entity 804 and the interfered UE 802 may receive the DL Rx 822 from the network entity 804. The UL Tx 823 and the DL Rx 822 may at least partially overlap in time, may at least partially overlap in frequency, and/or may be adjacent in frequency so as to interfere with one another. At 824, the interfered UE 802 may then perform IC on the DL Rx 822 using IC information for the UL Tx 823.

In one aspect, the interfered UE 802 may not be configured to decode the DCI 821 scheduling the UL Tx 823. The network entity 804 may indicate at least some of the parameters used by the interfered UE 802 for SLIC or CWIC (i.e., to demodulate or decode the UL Tx 823) in the DCI 820 scheduling the DL Rx 822. For example, the DCI 820 may indicate the modulation scheme or MCS of PUSCH for the U1 Tx 823. The IC information 816 may include RRC scheduling, and the DCI 820 may indicate parameters of the DCI 821 (e.g., PUSCH DMRS sequence seed, scrambling ID for PUSCH) to the interfered UE 802 by selecting such values from one or more lists in an RRC message.

The interfering UE 806 of the communication flow diagram 800 may not be configured to transmit a UE capability to the network entity 804 as the network entity 804 may not be configured to send any data to the interfering UE 806 that parameters are shared between the interfered UE 802 and the interfering UE 806. The interfering UE 806 may be a legacy UE that does not have any UE capability to understand shared parameters, while the interfered UE 802 may be a newer UE that has the UE capability to understand shared parameters and perform proactive IC on transmissions using such shared parameters.

FIG. 9 is a flowchart 900 of a method of wireless communication. The method may be performed by a first UE (e.g., the UE 104, 350, 416, 426, 502, 702, 802; the apparatus 1104). At 902, the first UE may transmit, to a network entity, UE capability of the first UE. For example, 902 may be performed by the interfered UE 502 in FIG. 5, which may transmit UE capability of the interfered UE 502 to the network entity 504. Moreover, 902 may be performed by the apparatus 1104 in FIG. 11.

At 904, the first UE may receive, from the network entity, a first DCI that schedules a downlink transmission for the first UE and provides IC information for an uplink transmission for a second UE scheduled to at least partially overlap in time and frequency with the downlink transmission. For example, 904 may be performed by the interfered UE 502 in FIG. 5, which may receive, from the network entity 504, a DCI 520 that schedules the DL Rx 522 for the interfered UE 502 and provides IC information, such as UL Tx specific parameters 614 and shared parameters 616 in FIG. 6, for the UL Tx 523 for the interfering UE 506 scheduled to at least partially overlap in time and frequency with the DL Rx 522. Moreover, 904 may be performed by the apparatus 1104 in FIG. 11.

Finally, at 906, the first UE may decode the downlink transmission based on at least a portion of the IC information for the uplink transmission. For example, 906 may be performed by the interfered UE 502 in FIG. 5, which may decode the DL Rx 522 based on at least a portion of the IC for the UL Tx 523 provided in the DCI 520. Moreover, 904 may be performed by the apparatus 1104 in FIG. 11.

FIG. 10 is a flowchart 1000 of a method of wireless communication. The method may be performed by a network entity (e.g., the base station 102, 310; the network entity 402, 504, 704, 804, 1102. At 1002, the network entity may schedule a downlink transmission for a first UE and an uplink transmission for a second UE, where the uplink transmission at least partially overlaps in time and frequency with the downlink transmission. For example, 1002 may be performed by the network entity 504 in FIG. 5, which may generate a DCI at 518 that schedules the DL Rx 522 to the interfered UE 502 and the UL Tx 523 from the interfering UE 506. The DL Rx 522 and the UL Tx 523 may at least partially overlap in time and frequency with the downlink transmission. Moreover, 1002 may be performed by the network entity 1202 in FIG. 12.

At 1004, the network entity may output, to the first UE, a first DCI that schedules the downlink transmission and provides IC information for the uplink transmission. For example, 1004 may be performed by the network entity 504 in FIG. 5, which may output, to the interfered UE 502, the DCI 520 that schedules the DL Rx 522 and provides IC information, such as UL Tx specific parameters 614 and shared parameters 616 in FIG. 6, for the UL Tx 523. Moreover, 1002 may be performed by the network entity 1202 in FIG. 12.

Figure 11:
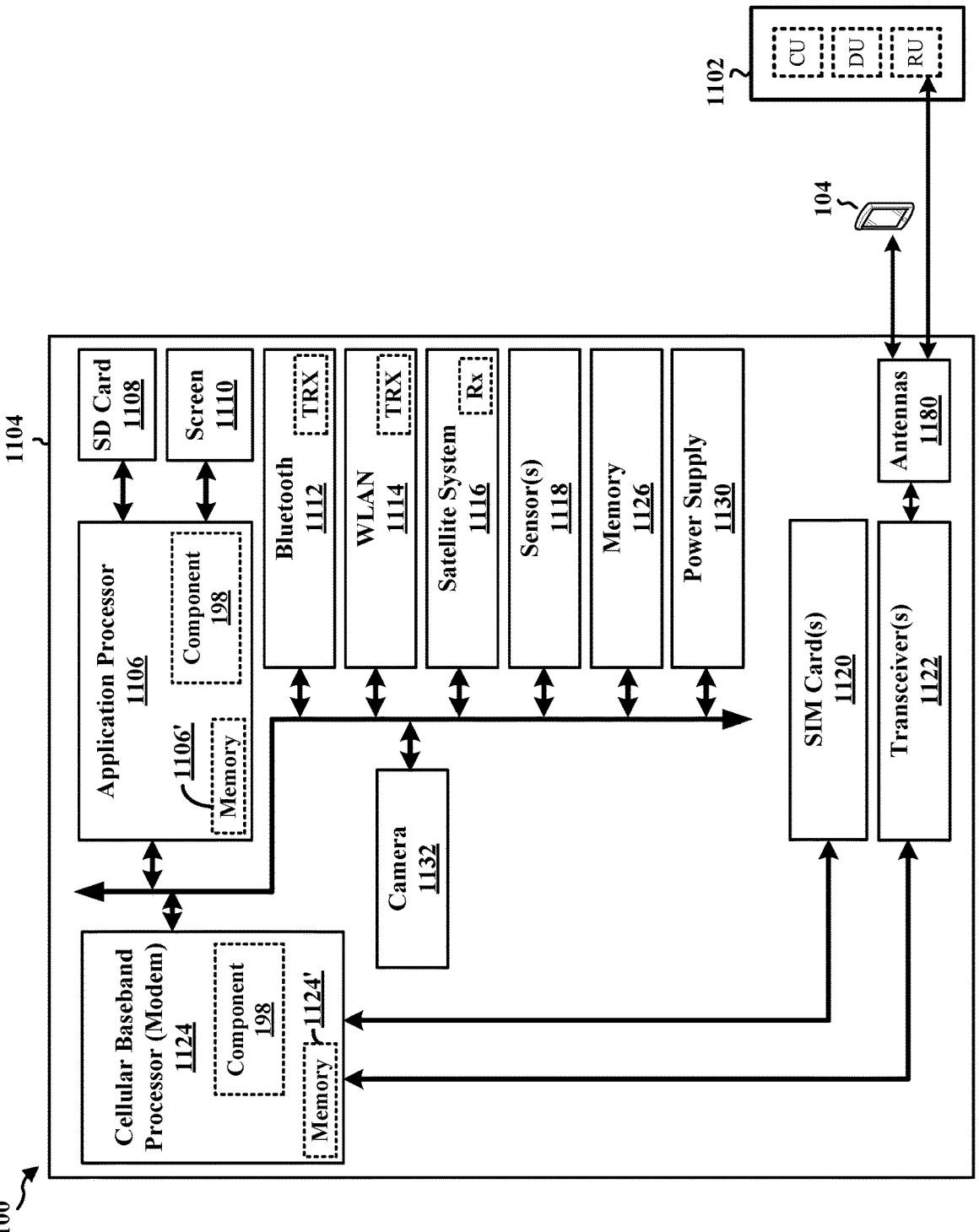
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, a satellite system module 1116 (e.g., GNSS module), one or more sensor modules 1118 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the satellite system module 1116 may include an on-chip transceiver (TRx)/receiver (Rx). The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the Tx processor 368, the Rx processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see UE 350 of FIG. 3) and include additional modules of the apparatus 1104.

As discussed supra, the component 198 is configured to transmit, to a network entity, UE capability of the first UE. The component 198 may further be configured to receive, from the network entity, a first DCI that schedules a downlink transmission for the first UE and provides IC information for an uplink transmission for a second UE scheduled to at least partially overlap in time and frequency with the downlink transmission. The component 198 may further be configured to decode the downlink transmission based on at least a portion of the IC information for the uplink transmission. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for transmitting, to a network entity, UE capability of the first UE, means for receiving, from the network entity, a first DCI that schedules a downlink transmission for the first UE and provides IC information for an uplink transmission for a second UE scheduled to at least partially overlap in time and frequency with the downlink transmission, means for decoding the downlink transmission based on at least a portion of the IC information for the uplink transmission, means for processing at least a portion of the uplink transmission based on the IC information to generate additional IC information, means for canceling interference on the downlink transmission that is caused by the uplink transmission based on the additional IC information, means for processing at least the portion of the uplink transmission by demodulating and decoding at least the portion of the uplink transmission, means for receiving an indicator from the network entity that the IC information includes the one or more shared parameters that are common to the downlink transmission and the uplink transmission, means for decoding at least the portion of the uplink transmission using the IC information by decoding at least a portion of the uplink transmission using the one or more shared parameters, means for decoding a second DCI scheduling the uplink transmission for the second UE using the shared RNTI to determine a DMRS or an MCS for the uplink transmission, means for decoding at least the portion of the uplink transmission using the IC information by decoding at least the portion of the uplink transmission using the DMRS or the MCS, means for receiving, from the network entity, a second DCI that schedules an additional downlink transmission that does not overlap in time and frequency with the uplink transmission from the second UE, means for decoding at least the portion of the uplink transmission using the IC information in response to determining that the first DCI includes the shared RNTI, means for decoding a second DCI scheduling the uplink transmission for the second UE using an RNTI for the uplink transmission to determine a DMRS or an MCS for the uplink transmission, means for decoding at least the portion of the uplink transmission using the IC information by decoding at least the portion of the uplink transmission using the DMRS or the MCS, means for decoding at least the portion of the uplink transmission using the IC information by decoding at least the portion of the uplink transmission using at least the DMRS or the MCS for the uplink transmission, means for performing IC on the downlink transmission by performing CWIC using the scrambling sequence seed, means for. receiving, from the network entity, an RRC configuration of a set of parameters, and means for decoding at least the portion of the uplink transmission using the IC information by decoding at least the portion of the uplink transmission using the TA. The means may be the component 198 of the apparatus 1104 configured to perform the functions recited by the means. As described supra, the apparatus 1104 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 12:
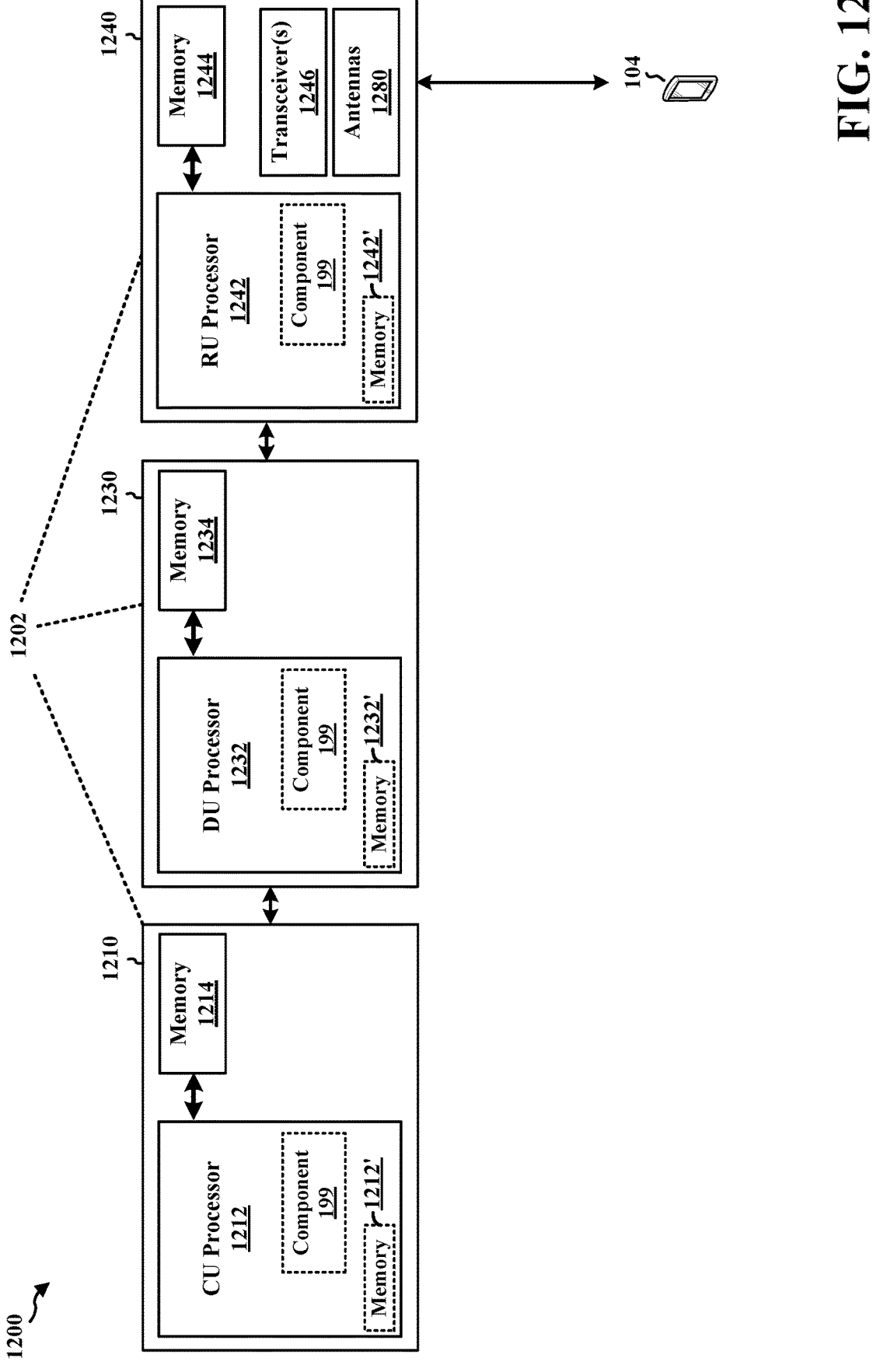
FIG. 12 is a diagram illustrating an example of a hardware implementation for an example network entity.

FIG. 12 is a diagram 1200 illustrating an example of a hardware implementation for a network entity 1202. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214. The CU 1210 communicates with the DU 1230. The DU 1230 may include a DU processor 1232. The DU processor 1232 may include on-chip memory 1232'. In some aspects, the DU 1230 may further include additional memory modules 1234. The DU 1230 communicates with the RU 1240. The RU 1240 may include an RU processor 1242. The RU processor 1242 may include on-chip memory 1242'. In some aspects, the RU 1240 may further include additional memory modules 1244, one or more transceivers 1246, and antennas 1280. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to schedule a downlink transmission for a first UE and an uplink transmission for a second UE, where the uplink transmission at least partially overlaps in time and frequency with the downlink transmission. The component 199 may also be configured to output, to the first UE, a first DCI that schedules the downlink transmission and provides IC information for the uplink transmission. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for scheduling a downlink transmission for a first UE and an uplink transmission for a second UE, means for outputting, to the first UE, a first DCI that schedules the downlink transmission and provides IC information for the uplink transmission, means for scheduling the downlink transmission to have at least one of an MCS, a new data indicator, a redundancy version, a HARQ process number, an assignment index, a resource indicator, a TPC command, or a feedback timing indicator different from the uplink transmission, means for outputting, to the first UE, an indicator that the IC information includes one or more shared parameters that are common to the downlink transmission and the uplink transmission, means for scrambling a CRC of a second DCI scheduling the uplink transmission using the shared RNTI, means for outputting, to the first UE, the second DCI scheduling the uplink transmission, means for outputting, to the first UE, a second DCI that schedules an additional downlink transmission that does not overlap in time and frequency with the uplink transmission from the second UE, means for obtaining, from the first UE, a report that the first UE is capable of performing IC on the downlink transmission, means for scheduling the uplink transmission to at least partially overlap in time and frequency with the downlink transmission to be in response to obtaining the report that the first UE is capable of performing IC on the downlink transmission, means for determining what IC information to output to the first UE based on an identifier of a type of IC, means for including a scrambling sequence seed in the IC information of the first DCI in response to the identifier identifying the type of IC as CWIC, and means for outputting, to the first UE, an RRC configuration that defines a set of parameters. The means may be the component 199 of the network entity 1202 configured to perform the functions recited by the means. As described supra, the network entity 1202 may include the Tx processor 316, the Rx processor 370, and the controller/processor 375. As such, in one configuration, the means may be the Tx processor 316, the Rx processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a first UE, including transmitting, to a network entity, UE capability of the first UE. The method may further include receiving, from the network entity, a first DCI that schedules a downlink transmission for the first UE and provides IC information for an uplink transmission for a second UE scheduled to at least partially overlap in time and frequency with the downlink transmission. The method may further include decoding the downlink transmission based on at least a portion of the IC information for the uplink transmission.

Aspect 2 is the method of aspect 1, further including processing at least a part of the uplink transmission based on the IC information to generate additional IC information. The method may further include canceling interference on the downlink transmission that is caused by the uplink transmission based on the additional IC information.

Aspect 3 is the method of aspect 2, where processing at least the portion of the uplink transmission includes demodulating and decoding at least the portion of the uplink transmission.

Aspect 4 is the method of any of aspects 1 to 3, where the first DCI further schedules the uplink transmission for the second UE, and where the IC information includes one or more shared parameters between the downlink transmission for the first UE and the uplink transmission for the second UE.

Aspect 5 is the method of aspect 4, where the one or more shared parameters includes at least one of a time domain resource assignment, a frequency resource domain assignment, an RNTI, a DMRS, an MCS, or a scrambling sequence seed.

Aspect 6 is the method of any of aspects 4 to 5, where the first DCI further includes one or more downlink parameters for the downlink transmission and one or more uplink parameters for the uplink transmission in addition to the one or more shared parameters.

Aspect 7 is the method of aspect 6, where the first DCI schedules the downlink transmission by indicating at least one of an MCS, a new data indicator, a redundancy version, a HARQ process number, an assignment index, a resource indicator, a TPC command, or a feedback timing indicator different from the uplink transmission.

Aspect 8 is the method of any of aspects 1 to 7, where the IC information includes one or more shared parameters that are common to the downlink transmission and the uplink transmission.

Aspect 9 is the method of aspect 8, further including receiving an indicator from the network entity that the IC information includes the one or more shared parameters that are common to the downlink transmission and the uplink transmission. The method may further include decoding at least the portion of the uplink transmission using the IC information by decoding at least a part of the uplink transmission using the one or more shared parameters.

Aspect 10 is the method of aspect 9, where the one or more shared parameters includes at least one of a shared RNTI, a shared DMRS, a shared MCS, or a shared scrambling sequence seed.

Aspect 11 is the method of aspect 10, further including decoding a second DCI scheduling the uplink transmission for the second UE using the shared RNTI to determine a DMRS or an MCS for the uplink transmission. The method may further include decoding at least the portion of the uplink transmission using the IC information by decoding at least the portion of the uplink transmission using the DMRS or the MCS.

Aspect 12 is the method of any of aspects 10 to 11, further including receiving, from the network entity, a second DCI that schedules an additional downlink transmission that does not overlap in the time and the frequency with the uplink transmission from the second UE. The second DCI may include a C-RNTI different from the shared RNTI. The indicator may include the shared RNTI. The method may further include decoding at least the portion of the uplink transmission using the IC information in response to determining that the first DCI includes the shared RNTI.

Aspect 13 is the method of any of aspects 1 to 12, further including decoding a second DCI scheduling the uplink transmission for the second UE using an RNTI for the uplink transmission to determine a DMRS or an MCS for the uplink transmission. The method may further include decoding at least the portion of the uplink transmission using the IC information by decoding at least the portion of the uplink transmission using the DMRS or the MCS. The IC information may include the RNTI for the uplink transmission.

Aspect 14 is the method of any of aspects 1 to 13, where the IC information may include a DMRS or an MCS for the uplink transmission. The method may further include decoding at least the portion of the uplink transmission using the IC information by decoding at least the portion of the uplink transmission using at least the DMRS or the MCS for the uplink transmission.

Aspect 15 is the method of aspect 14, where the IC information includes a scrambling sequence seed. The method may further include performing IC on the downlink transmission by performing CWIC using the scrambling sequence seed.

Aspect 16 is the method of any of aspects 1 to 15, further including receiving, from the network entity, an RRC configuration of a set of parameters. The DCI may indicate the IC information from the set of parameters.

Aspect 17 is the method of any of aspects 1 to 16, where the IC information includes a TA for the uplink transmission. The method may further include decoding at least the portion of the uplink transmission using the IC information by decoding at least the portion of the uplink transmission using the TA.

Aspect 18 is a method of wireless communication at a network entity, including scheduling a downlink transmission for a first UE and an uplink transmission for a second UE. The uplink transmission may at least partially overlap in time and frequency with the downlink transmission. The method may further include outputting, to the first UE, a first DCI that schedules the downlink transmission and provides IC information for the uplink transmission.

Aspect 19 is the method of aspect 18, where the first DCI further schedules the uplink transmission for the second UE. The IC information may include one or more shared parameters between the downlink transmission for the first UE and the uplink transmission for the second UE.

Aspect 20 is the method of any of aspects 18 to 19, where the one or more shared parameters includes at least one of a time domain resource assignment, a frequency resource domain assignment, an RNTI, a DMRS, an MCS, or a scrambling sequence seed.

Aspect 21 is the method of any of aspects 18 to 20, further including scheduling the downlink transmission to have at least one of an MCS, a new data indicator, a redundancy version, a HARQ process number, an assignment index, a resource indicator, a TPC command, or a feedback timing indicator different from the uplink transmission.

Aspect 22 is the method of aspect 21, where the first DCI further includes one or more downlink parameters for the downlink transmission and one or more uplink parameters for the uplink transmission in addition to the one or more shared parameters.

Aspect 23 is the method of any of aspects 21 to 22, where the IC information includes one or more shared parameters that are common to the downlink transmission and the uplink transmission.

Aspect 24 is the method of aspect 23, further including outputting, to the first UE, an indicator that the IC information includes the one or more shared parameters that are common to the downlink transmission and the uplink transmission.

Aspect 25 is the method of aspect 24, where the one or more shared parameters includes at least one of a shared RNTI, a shared DMRS, a shared MCS, or a shared scrambling sequence seed.

Aspect 26 is the method of any aspect 25, further including scrambling a CRC of a second DCI scheduling the uplink transmission using the shared RNTI. The method may further include outputting, to the first UE, the second DCI scheduling the uplink transmission.

Aspect 27 is the method of any of aspects 25 to 26, further including outputting, to the first UE, a second DCI that schedules an additional downlink transmission that does not overlap in the time and the frequency with the uplink transmission from the second UE, the second DCI having a C-RNTI different from the shared RNTI.

Aspect 28 is the method of any of aspects 18 to 27, where the IC information includes at least one of an RNTI for the uplink transmission different from an RNTI for the downlink transmission Aspect 29 is the method of any of aspects 18 to 28, where the IC information includes a DMRS for the uplink transmission or an MCS for the uplink transmission.

Aspect 30 is the method of any of aspects 18 to 29, further including obtaining, from the first UE, a report that the first UE is capable of performing IC on the downlink transmission. The method may further include scheduling the uplink transmission to at least partially overlap in the time and the frequency with the downlink transmission to be in response to obtaining the report that the first UE is capable of performing the IC on the downlink transmission.

Aspect 31 is the method of aspect 30, further including determining what IC information to output to the first UE based on an identifier of a type of IC. The report obtained from the first UE may include the identifier of the type of IC. The identifier may identify a type of IC including at least one of SLIC or CWIC.

Aspect 32 is the method of any of aspects 30 to 31, further comprising including a scrambling sequence seed in the IC information of the first DCI in response to the identifier identifying the type of IC as CWIC.

Aspect 33 is the method of any of aspects 18 to 32, further including outputting, to the first UE, an RRC configuration that defines a set of parameters, and where the DCI selects the IC information from the set of parameters.

Aspect 34 is the method of any of aspects 18 to 33, where the IC information includes a TA for the uplink transmission.

What is claimed is:

1. An apparatus for wireless communication at a first user equipment (UE), comprising:
memory; and
one or more processors coupled to the memory and configured to cause the first UE to:
receive, from a network entity, a single downlink control information (DCI) that includes:
a first indicator of a schedule for a downlink transmission associated with the first UE, and
a second indicator that provides interference cancellation (IC) information for an uplink transmission associated with a second UE, wherein the uplink transmission is scheduled to at least partially overlap in time and frequency with the downlink transmission, wherein the network entity does not comprise the second UE; and
decode the downlink transmission based on at least a portion of the IC information for the uplink transmission.

2. The apparatus of claim 1, wherein the one or more processors are further configured to cause the first UE to:
process at least a part of the uplink transmission based on the IC information to generate additional IC information; and
cancel interference on the downlink transmission that is caused by the uplink transmission based on the additional IC information.

3. The apparatus of claim 2, wherein the one or more processors are further configured to cause the first UE to:
process at least the portion of the uplink transmission by demodulating and decoding at least the portion of the uplink transmission.

4. The apparatus of claim 1, further comprising:
a transceiver coupled to the one or more processors, wherein the single DCI received by the transceiver further includes a third indicator of a second schedule for the uplink transmission for the second UE, and wherein the IC information comprises one or more shared parameters between the downlink transmission for the first UE and the uplink transmission for the second UE.

5. The apparatus of claim 4, wherein the one or more shared parameters comprises at least one of a time domain resource assignment, a frequency resource domain assignment, a radio network temporary identifier (RNTI), a demodulation reference signal (DMRS), a modulation and coding scheme (MCS), or a scrambling sequence seed.

6. The apparatus of claim 4, wherein the single DCI further includes a fourth indicator of one or more downlink parameters for the downlink transmission and one or more uplink parameters for the uplink transmission in addition to the one or more shared parameters.

7. The apparatus of claim 6, wherein the first indicator of the schedule for the downlink transmission comprises an indicator of at least one of an MCS, a new data indicator, a redundancy version, a hybrid automatic repeat request (HARQ) process number, an assignment index, a resource indicator, a transmission control protocol (TPC) command, or a feedback timing indicator different from the uplink transmission.

8. The apparatus of claim 1, wherein the IC information comprises one or more shared parameters that are common to the downlink transmission and the uplink transmission.

9. The apparatus of claim 8, wherein the one or more processors are further configured to cause the first UE to:
  receive a third indicator from the network entity that the IC information comprises the one or more shared parameters that are common to the downlink transmission and the uplink transmission; and
  decode at least the portion of the uplink transmission using the IC information by decoding at least the portion of the uplink transmission using the one or more shared parameters.

10. The apparatus of claim 9, wherein the one or more shared parameters comprises at least one of a shared RNTI, a shared DMRS, a shared MCS, or a shared scrambling sequence seed.

11. The apparatus of claim 10, wherein the one or more processors are further configured to cause the first UE to:
  decode a second DCI that includes a fourth indicator of the uplink transmission for the second UE based on the shared RNTI to determine a DMRS or an MCS for the uplink transmission; and
  decode at least the portion of the uplink transmission based on the IC information by decoding at least the portion of the uplink transmission based on the DMRS or the MCS.

12. The apparatus of claim 10, wherein the one or more processors are further configured to cause the first UE to:
  receive, from the network entity, a second DCI that includes a fourth indicator of an additional downlink transmission that does not overlap in the time and the frequency with the uplink transmission from the second UE, wherein the second DCI comprises a cell RNTI (C-RNTI) different from the shared RNTI, wherein the third indicator comprises the shared RNTI; and
  decode at least the portion of the uplink transmission based on the shared RNTI in response to a determination that the single DCI comprises the shared RNTI.

13. The apparatus of claim 1, wherein the one or more processors are further configured to cause the first UE to:
  decode a second DCI that includes a fourth indicator of the uplink transmission for the second UE based on an RNTI for the uplink transmission to determine a DMRS or an MCS for the uplink transmission; and decode at least the portion of the uplink transmission using the DMRS or the MCS, and wherein the IC information comprises the RNTI for the uplink transmission.

14. The apparatus of claim 1, wherein the IC information comprises a DMRS or an MCS for the uplink transmission, wherein the one or more processors are further configured to cause the first UE to:
  decode at least the portion of the uplink transmission based on the IC information by decoding at least the portion of the uplink transmission based on at least the DMRS or the MCS for the uplink transmission.

15. The apparatus of claim 14, wherein the IC information comprises a scrambling sequence seed, wherein the one or more processors are further configured to cause the first UE to:
  perform IC on the downlink transmission by a performance of codeword level interference cancellation (CWIC) that uses the scrambling sequence seed.

16. The apparatus of claim 1, wherein the one or more processors are further configured to cause the first UE to:
  receive, from the network entity, an RRC configuration, wherein the RRC configuration includes a third indicator of a set of parameters, wherein the second indicator comprises a selection of the IC information from the set of parameters.

17. The apparatus of claim 1, wherein the IC information comprises a timing advance (TA) for the uplink transmission, wherein the one or more processors are further configured to cause the first UE to:
  decode at least the portion of the uplink transmission based on the IC information by decoding at least the portion of the uplink transmission based on the TA.

18. The apparatus of claim 1, wherein the one or more processors are further configured to cause the first UE to:
  transmit a UE capability of the first UE, wherein the UE capability includes a third indicator that indicates support for one or more IC operations, wherein the IC information is based on the one or more IC operations supported by the first UE.

19. An apparatus for wireless communication at a network entity, comprising:
  memory; and
  one or more processors coupled to the memory and configured to cause the network entity to:
    schedule a downlink transmission for a first user equipment (UE) and an uplink transmission for a second UE, wherein the uplink transmission at least partially overlaps in time and frequency with the downlink transmission, wherein the network entity does not comprise the second UE; and
    output, to the first UE, a single downlink control information (DCI), wherein the single DCI includes:
      a first indicator of the scheduled downlink transmission for the first UE, and
      a second indicator that provides interference cancellation (IC) information for the scheduled uplink transmission for the second UE.

20. The apparatus of claim 19, further comprising:
  a transceiver coupled to the one or more processors and configured to transmit the single DCI, wherein the single DCI transmitted by the transceiver further includes a third indicator of a second schedule for the uplink transmission for the second UE, and wherein the IC information comprises one or more shared parameters between the downlink transmission for the first UE and the uplink transmission for the second UE.

21. The apparatus of claim 20, wherein the ne or mor shared parameters comprises at least one of a time domain resource assignment, a frequency resource domain assignment, a radio network temporary identifier (RNTI), a demodulation refrence signal (DMRS), a modulation and coding scheme (MCS), or a scrambling sequence seed.

22. The apparatus of claim 20, wherein the one or more processors are further configured to cause the network entity to:

schedule the downlink transmission to have at least one of an MCS, a new data indicator, a redundancy version, a hybrid automatic repeat request (HARQ) process number, an assignment index, a resource indicator, a transmission control protocol (TPC) command, or a feedback timing indicator different from the uplink transmission, and wherein the single DCI further includes a fourth indicator of one or more downlink parameters for the downlink transmission and one or more uplink parameters for the uplink transmission in addition to the one or more shared parameters.

23. The apparatus of claim 19, wherein the IC information comprises one or more shared parameters that are common to the downlink transmission and the uplink transmission.

24. The apparatus of claim 23, wherein the one or more processors are further configured to cause the network entity to:

output, to the first UE, a third indicator that the IC information comprises the one or more shared parameters that are common to the downlink transmission and the uplink transmission, and wherein the one or more shared parameters comprises at least one of a shared RNTI, a shared DMRS, a shared MCS, or a shared scrambling sequence seed.

25. The apparatus of claim 24, wherein the one or more processors are further configured to cause the network entity to:

scramble a cyclic redundancy check (CRC) of a second DCI, wherein the second DCI includes a sixth indicator of the scheduled uplink transmission based on the shared RNTI; and output, to the first UE, the second DCI that includes the sixth indicator of the scheduled uplink transmission.

26. The apparatus of claim 24, wherein the one or more processors are further configured to cause the network entity to:

output, to the first UE, a second DCI that includes a sixth indicator of an additional downlink transmission that does not overlap in the time and the frequency with the uplink transmission from the second UE, wherein the second DCI has a cell RNTI (C-RNTI) different from the shared RNTI.

27. The apparatus of claim 19, wherein the IC information comprises at least one of a first RNTI for the uplink transmission different from a second RNTI for the downlink transmission, a DMRS for the uplink transmission or an MCS for the uplink transmission.

28. The apparatus of claim 19, wherein the one or more processors are further configured to cause the network entity to:

obtain, from the first UE, a report comprising a third indicator that the first UE has a capability to perform IC on the downlink transmission; and schedule the uplink transmission to at least partially overlap in the time and the frequency with the downlink transmission in response to the obtained report comprising the third indicator that the first UE has the capability to perform the IC on the downlink transmission.

29. The apparatus of claim 28, wherein the obtained report comprises an identifier of a type of IC, wherein the identifier identifies at least one of symbol level interference cancellation (SLIC) or codeword level interference cancellation (CWIC), wherein the one or more processors are further configured to cause the network entity to:

generate the IC information to output to the first UE based on the identifier of the type of IC; and include a scrambling sequence seed in the IC information of the single DCI in response to the identifier that identifies the type of the IC as the CWIC.

30. The apparatus of claim 19, wherein the one or more processors are further configured to cause the network entity to:

output, to the first UE, an RRC configuration, wherein the RRC configuration includes a third indicator that defines a set of parameters, and wherein the second indicator comprises a selection of the IC information from the set of parameters.

31. The apparatus of claim 19, wherein the IC information comprises a timing advance (TA) for the uplink transmission.

32. A method for wireless communication at a first user equipment (UE), comprising:

receiving, from a network entity, a single downlink control information (DCI) that includes:

a first indicator of a schedule for a downlink transmission associated with the first UE, and a second indicator providing interference cancellation (IC) information for an uplink transmission associated with a second UE, wherein the uplink transmission is scheduled to at least partially overlap in time and frequency with the downlink transmission, wherein the network entity does not comprise the second UE; and decoding the downlink transmission based on at least a portion of the IC information for the uplink transmission.

33. The method of claim 32, wherein the IC information comprises one or more shared parameters common to the downlink transmission and the uplink transmission, the method further comprising:

receiving a third indicator from the network entity indicating that the IC information comprises the one or more shared parameters common to the downlink transmission and the uplink transmission; and decoding at least the portion of the uplink transmission using the IC information by decoding at least the portion of the uplink transmission using the one or more shared parameters.

34. A method for wireless communication at a network entity, comprising:

scheduling a downlink transmission for a first user equipment (UE) and an uplink transmission for a second UE, the uplink transmission at least partially overlapping in time and frequency with the downlink transmission, wherein the network entity does not comprise the second UE; and outputting, to the first UE, a single downlink control information (DCI), wherein the single DCI includes:

a first indicator of the scheduled downlink transmission for the first UE, and a second indicator providing interference cancellation (IC) information for the scheduled uplink transmission for the second UE.

35. The method of claim 34, wherein the IC information comprises one or more shared parameters common to the downlink transmission and the uplink transmission, the method further comprising:

outputting, to the first UE, a third indicator indicating that the IC information comprises the one or more shared parameters common to the downlink transmission and the uplink transmission, and wherein the one or more shared parameters comprises at least one of a shared RNTI, a shared DMRS, a shared MCS, or a shared scrambling sequence seed.

* * * * *